US012460355B1

(12) United States Patent
Bartek et al.

(10) Patent No.: US 12,460,355 B1
(45) Date of Patent: Nov. 4, 2025

(54) RAILROAD SPIKE STABILIZER FOR RAILROAD AND CONSTRUCTION APPLICATIONS

(71) Applicant: FTS Tools, LLC, Ledgewood, NJ (US)

(72) Inventors: Peter J. Bartek, Lynchburg, VA (US);
Charlie Preston, Lynchburg, VA (US);
Kevin Pugh, Lynchburg, VA (US);
Peter M. Bartek, Ledgewood, NJ (US)

(73) Assignee: FTS Tools, LLC, Ledgewood, NJ (US)

( * ) Notice: Subject to any disclaimer, the term of this patent is extended or adjusted under 35 U.S.C. 154(b) by 0 days.

(21) Appl. No.: 19/245,737

(22) Filed: Jun. 23, 2025

Related U.S. Application Data

(60) Provisional application No. 63/747,542, filed on Jan. 21, 2025, provisional application No. 63/740,086, filed on Dec. 30, 2024.

(51) Int. Cl.
*E01B 9/12* (2006.01)
*E01B 9/16* (2006.01)

(52) U.S. Cl.
CPC . *E01B 9/12* (2013.01); *E01B 9/16* (2013.01)

(58) Field of Classification Search
CPC ..... E01B 9/12; E01B 9/14; E01B 9/16; E01B 9/18
See application file for complete search history.

(56) References Cited

U.S. PATENT DOCUMENTS

| 3,172,603 | A | * | 3/1965 | Bell | F16B 13/124 52/223.13 |
|---|---|---|---|---|---|
| 3,964,680 | A | * | 6/1976 | Arthur | F16B 13/122 238/371 |
| 4,203,193 | A | * | 5/1980 | Arthur | F16B 13/122 238/371 |
| 2010/0224691 | A1 | * | 9/2010 | McQuistian | E01B 9/06 238/371 |
| 2016/0298299 | A1 | * | 10/2016 | Hamilton | E01B 9/12 |

\* cited by examiner

*Primary Examiner* — Robert J McCarry, Jr.
(74) *Attorney, Agent, or Firm* — Banner & Witcoff, Ltd.

(57) ABSTRACT

The present invention relates to a railroad spike stabilizer for railway and construction applications. The stabilizer comprises a hollow, square-based prism body with four outer walls defining an internal cavity conforming to a railroad spike's geometry. The cavity, open at the top, tapers inward with angled inner walls. Segmented, flexible legs extend from the bottom, compressing and expanding to engage the tie plate hole, with clips locking the stabilizer. Flexible ribs adapt to hole variations, and a visual alignment guide ensures orientation. A spike and plug stabilizer embodiment includes a ribbed or finned plug for pre-existing holes, enhancing spike stability and reducing fatigue compared to wood plugs or polyurethane foam. The stabilizer improves alignment, reduces spike fatigue, minimizes worker injuries, and enables single-worker operations.

24 Claims, 19 Drawing Sheets

RAILROAD SPIKE STABILIZER FOR RAILROAD AND CONSTRUCTION APPLICATIONS

CROSS-REFERENCE TO RELATED APPLICATIONS

This application claims priority to U.S. Provisional Application No. 63/747,542, filed Jan. 21, 2025 and U.S. Provisional Application No. 63/740,086, filed Dec. 30, 2024, which are herein incorporated by reference in their entirety.

TECHNICAL FIELD

The present invention relates to stabilizers for securing railroad spikes during installation in railroad and construction applications, specifically designed to enhance safety, efficiency, and alignment while reducing spike fatigue and worker injuries.

BACKGROUND OF THE INVENTION

Conventional methods for installing railroad spikes in railroad tie plates and construction applications are labor-intensive, hazardous, and prone to long-term structural issues. These methods typically require multiple workers to manually align and place spikes, increasing the risk of injuries such as hand injuries from hammer mishits, repetitive strain injuries from prolonged manual effort, and accidents caused by unstable spike placement during driving. The absence of a stabilizing mechanism during the initial driving phase frequently results in misalignment, which not only complicates the installation process but also contributes to spike fatigue and reduced spike stability. Misaligned or loosely driven spikes experience uneven load distribution, leading to accelerated wear, loosening over time, and potential derailment risks due to track instability.

The challenges are particularly pronounced when spiking into pre-existing holes, such as during tie plate replacement. The lack of an effective mechanism to fill or secure these holes exacerbates instability. Conventional approaches, such as using wood plugs, often result in misalignment, loose spikes, and increased spike fatigue due to inconsistent fit and poor load transfer, compromising the structural integrity of the track. Alternatively, filling holes with polyurethane foam requires 15 to 30 minutes for settling before a spike can be inserted, yet still necessitates hammering, which introduces further misalignment and fails to ensure stable spike placement. These methods do not adequately address the need for immediate, secure spike installation, leaving tracks vulnerable to long-term fatigue and failure. There is a critical need for a solution that enhances worker safety by reducing injury risks, improves installation efficiency, ensures precise alignment, and minimizes spike fatigue to maintain track stability in both standard spiking and hole-plugging scenarios.

SUMMARY OF THE INVENTION

The present invention provides a railroad spike stabilizer designed to address the aforementioned challenges. The spike stabilizer ensures precise alignment and stability during the driving process, reduces labor requirements, enhances workplace safety by minimizing injury risks, and minimizes spike fatigue through improved load distribution, thereby improving long-term track stability. The invention includes two embodiments: a spike stabilizer for use in new or standard tie plate holes and a spike with plug stabilizer for applications requiring the plugging of pre-existing holes, overcoming the limitations of wood plugs and polyurethane foam.

The standard spike stabilizer is designed for use with railroad spikes in railway and construction applications where no hole plugging is required. It comprises a hollow, square-based prism body with four outer walls that define an internal cavity configured to conform to the geometry of a railroad spike. The internal cavity, open at the top, tapers inward with angled inner walls to ensure a secure fit. The stabilizer includes segmented, flexible legs extending from the bottom surface, designed to compress and expand to engage the tie plate hole, with clips at the base of certain legs to lock the stabilizer in place. Flexible ribs on the walls and legs adapt to varying hole dimensions, and a visual alignment guide on the top surface ensures proper orientation. Methods of use include inserting the stabilizer into a tie plate hole either before or with the railroad spike, driving the spike with standard tools while the stabilizer maintains alignment, and securing the spike to reduce fatigue and enhance track stability through stable load distribution.

The spike with plug stabilizer is designed for scenarios where a pre-existing hole in the tie plate or tie must be plugged to secure the spike, such as during tie plate replacement. It includes a similar hollow, square-based prism body with an internal cavity for the spike, but incorporates a ribbed or finned plug component integrated with the body or legs. The plug fills the pre-existing hole, and its ribs or fins engage the hole's inner surfaces to enhance grip and stability, reducing spike fatigue by preventing movement within the hole. Unlike wood plugs or polyurethane foam, the plug ensures immediate spike installation without settling time and maintains alignment during driving, improving track durability. The stabilizer includes flexible legs, clips, ribs, and a visual alignment guide similar to the standard stabilizer. Methods of use involve inserting the plug-equipped stabilizer into the hole, driving the spike, and relying on the ribbed or finned plug to secure the spike firmly.

According to one embodiment, a spike stabilizer for use with a railroad spike and a railroad tie plate hole comprises: a body having a hollow, square-based prism shape with four outer walls defining an internal cavity configured to conform to the geometry of the railroad spike, extending from a top surface to a bottom surface; a plurality of legs extending from the bottom surface; and at least one clip extending outward from a base of one or more leg segments. The body exhibits a tapered geometry from top to bottom. The internal cavity is open at the top, with a rectangular or square cross-section that tapers inward. Each leg includes segmented leg segments configured to compress inward and expand outward to engage the tie plate hole. The clip engages the underside of the tie plate or inner edges of the hole.

According to another embodiment, a spike with plug stabilizer comprises a similar body and leg structure but includes a ribbed or finned plug extending from the bottom surface or integrated with the legs. The plug is configured to fill a pre-existing hole, with ribs or fins extending outward to engage the hole's inner surfaces, enhancing spike stability and reducing fatigue compared to wood plugs or polyurethane foam.

Implementations may include one or more of the following features for both embodiments: four outer walls (first, second, third, and fourth) with a uniform thickness of approximately 1 mm, reinforced with internal vertical ribs; a square top surface with chamfered edges and a bottom surface tapering inward to transition into the leg segments;

a body height of approximately 25-45 mm and width of 15-35 mm; an internal cavity with inner dimensions of 10-30 mm wide and 10-40 mm long at the top, narrowing to 5-10 mm wide and 18-22 mm long at the base, with internal walls angled inward at 2-5 degrees; a tapered body geometry with an angle of 5-10 degrees from vertical; leg segments with a length of 10-15 mm, width of 5-10 mm, and thickness of 1-3 mm; clips extending at 30-45 degrees from vertical, with a length of 2-10 mm and width of 1-3 mm; flexible ribs on walls and legs extending outward by 1-2 mm, spaced at 3 mm intervals; and a triangular visual alignment guide on the top surface for orientation. For the spike with plug stabilizer, the plug has a ribbed or finned structure, with ribs or fins extending 1-3 mm outward to secure the spike in the hole.

In another embodiment, Methods for installing a railroad spike using either stabilizer include: inserting the stabilizer into a tie plate hole (with the plug filling a pre-existing hole for the spike with plug stabilizer); inserting the spike into the internal cavity; driving the spike with standard tools while the stabilizer maintains alignment; and relying on the stabilizer's structure (and plug, if applicable) to reduce spike fatigue and enhance track stability through stable load distribution.

Other features and advantages of the invention will be apparent from the following specification taken in conjunction with the following drawings.

BRIEF DESCRIPTION OF DRAWINGS

The following Detailed Description will be better understood when considered in conjunction with the accompanying drawings in which like reference numerals refer to the same or similar elements in all of the various views in which that reference number appears.

Figure 1A:
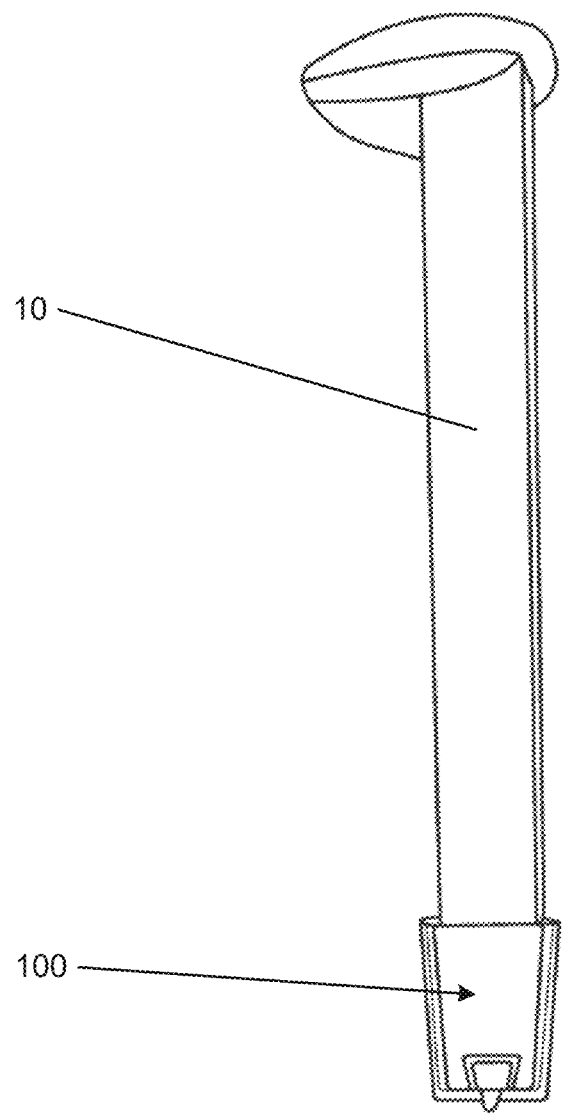
FIG. 1A depicts a front view of a railroad spike and a corresponding spike stabilizer, according to one or more aspects described herein.

Further, it is to be understood that the drawings may represent the scale of different components of one single embodiment; however, the disclosed embodiments are not limited to that particular scale.

DETAILED DESCRIPTION

In the following description of various examples of the invention, reference is made to the accompanying drawings, which form a part hereof, and in which are shown by way of illustration various example parts, structures, systems, and steps in which aspects of the invention may be practiced. It is to be understood that other specific arrangements of example parts, structures, systems, and steps may be utilized, and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

This application and/or claims may use the adjectives, e.g., "first," "second," "third," and the like, to identify certain components and/or features relating to this technology. These adjectives are used merely for convenience, e.g., to assist in maintaining a distinction between components and/or features of a specific structure. Use of these adjectives should not be construed as requiring a specific order or arrangement of the components and/or features being discussed. Also, use of these specific adjectives in the specification for a specific structure does not require that the same adjective be used in the claims to refer to the same part (e.g., a component or feature referred to as the "fourth" in the specification may correspond to any numerical adjective used for that component or feature in the claims).

The present invention pertains to a stabilizer system for railroad spikes, that enhances safety, efficiency, and sustainability in railroad and construction applications. The spike stabilizer may feature an internal cavity shaped like a railroad spike; a visual alignment guide; a tapered design;

segmented, flexible legs and locking clips; and wall ribs integrated into the body and legs to accommodate tie plate hole variations. The spike and plug stabilizer may be similarly designed for scenarios where a pre-existing hole in the tie plate or tie must be plugged to secure the spike, such as during tie plate replacement. The spike and plug stabilizer may include a similar hollow, square-based prism body with an internal cavity for the spike, but incorporates a ribbed or finned plug component integrated with the body or legs. The plug component may fill the pre-existing hole, and its ribs or fins engage the hole's inner surfaces to enhance grip and stability, reducing spike fatigue by preventing movement within the hole.

As depicted and illustrated in FIGS. 1A-5C, the present invention introduces a spike stabilizer 100 for use with the railway and construction applications. The spike stabilizer 100 may comprise a rectangular or square-sized body 120 with an internal cavity 150 designed to conform to the geometry of a railroad spike 10. The body 120 may comprise four outer walls that define the internal cavity 150 with legs extending 180 from the body 120. The four outer walls may include a first wall 132, a second wall 134, a third wall 136, and a fourth wall 138, with the first wall 132 being opposite the third wall 136; and the second wall 134 being opposite the fourth wall 138. The individual walls 132, 134, 136, 138 may be connected to the adjacent walls by flexible hinges or thin junctions 142.

Figure 1B:
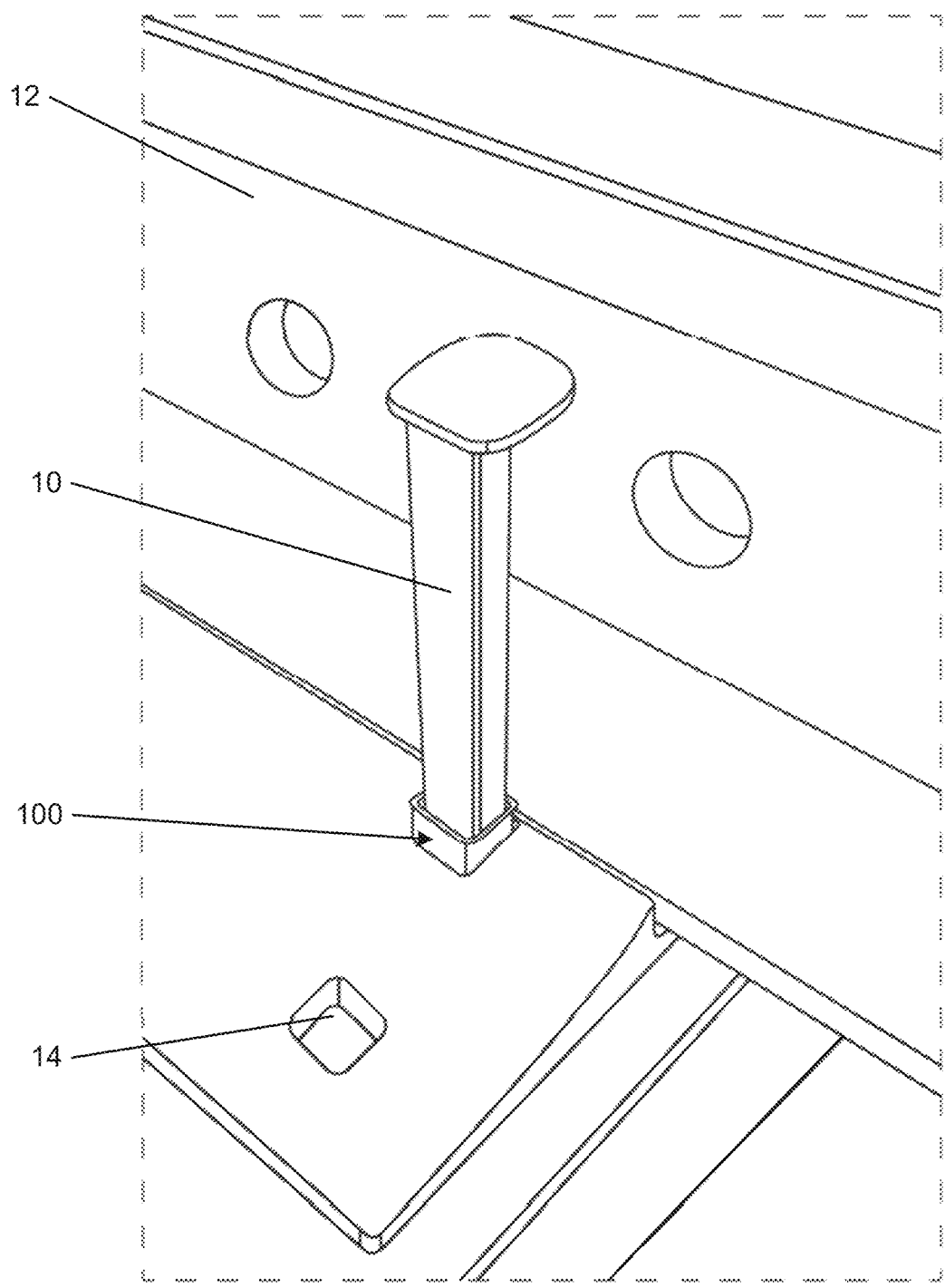
FIG. 1B depicts a side perspective view of the railroad spike and spike stabilizer from FIG. 1A being installed into a railroad tie plate and railroad tie plate hole, according to one or more aspects described herein.
Figure 2A:
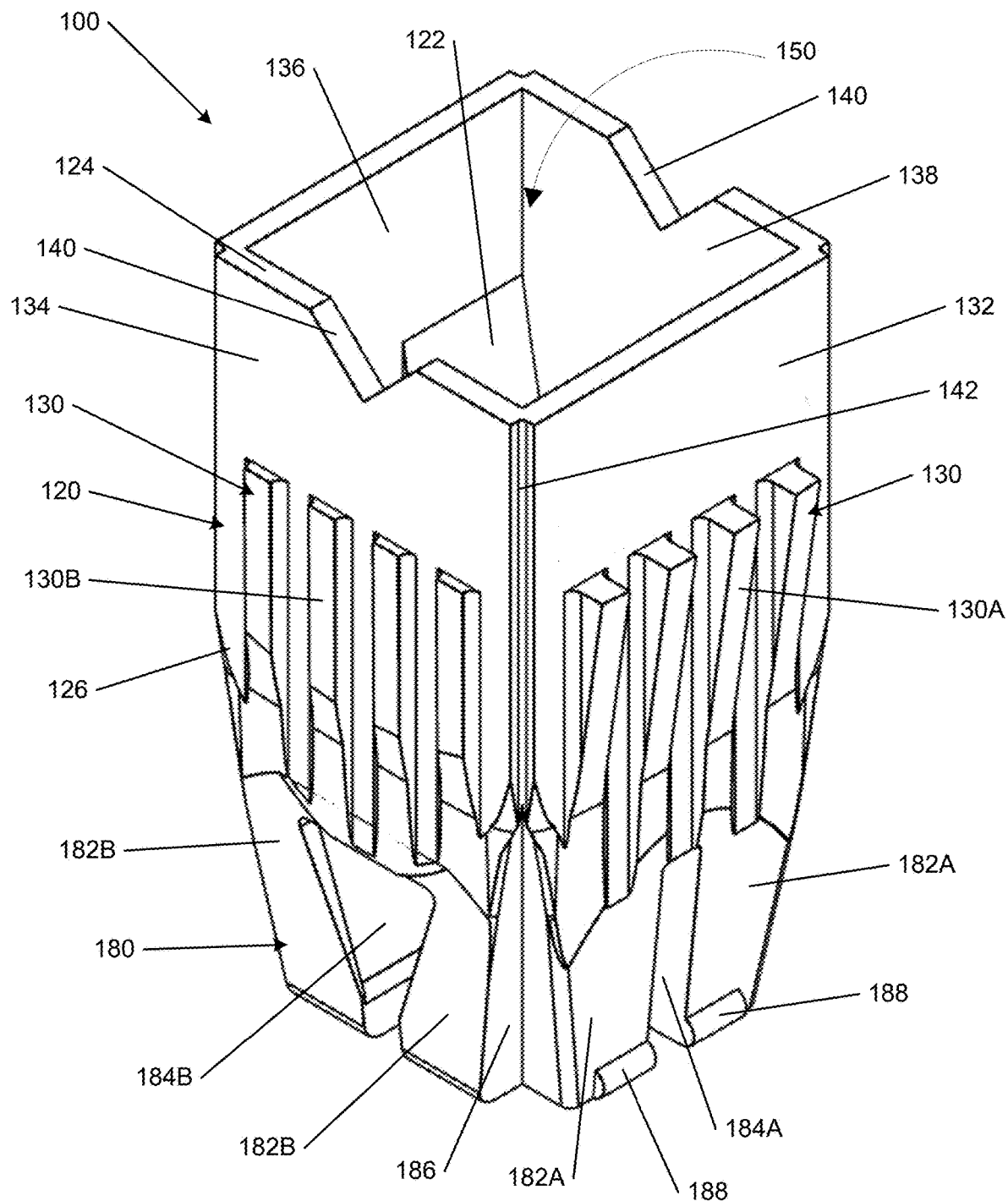
FIG. 2A depicts a side perspective view of a spike stabilizer, according to one or more aspects described herein.
Figure 2B:
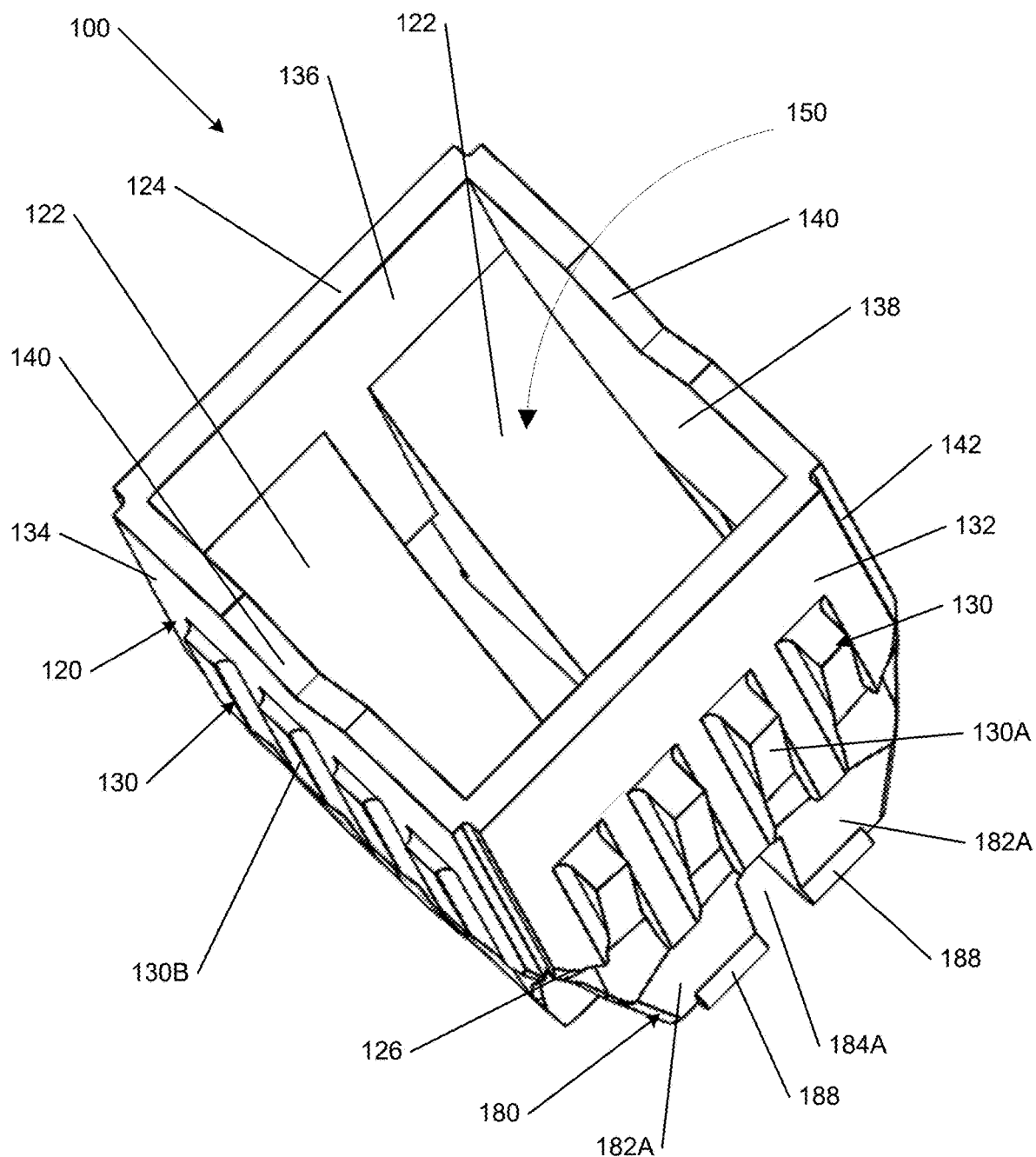
FIG. 2B depicts a top perspective view of the spike stabilizer from FIG. 2A, according to one or more aspects described herein.

FIGS. 1A and 1B illustrate an exemplary spike stabilizer 100 and a railroad spike 10. Specifically, FIG. 1A depicts the spike stabilizer 100 on the end of the railroad spike 10 and FIG. 1B depicts the spike stabilizer 100 being inserted into a hole 14 of the railroad tie 12 to then insert the railroad spike 10 into the hole 14 and the railroad tie 12.

As depicted in FIGS. 2A-5C, the spike stabilizer 100 may include a body 120 that defines an internal cavity 150. The body 120 of the spike stabilizer 100 may serve as the primary structural framework, integrating the internal cavity 150, legs 180, and external features into a cohesive unit. The body 120 may be a hollow, square-based prism with an overall height of approximately 25-45 mm, or approximately 35 mm, and width of approximately 15-35 mm, or approximately 20 mm, designed to match the depth of a typical railroad tie plate hole 14. The outer walls of the body 120 may be constructed from a uniform thickness of approximately 1 mm, which may provide structural rigidity. The outer walls of the body 120 may be reinforced with internal vertical ribs or struts 122. The vertical ribs or struts 122 may be spaced at intervals of 5-20 mm. The vertical ribs or struts 122 may connect a top surface 124 of the body 120 and a bottom surface 126 of the body 120 to enhance load-bearing capacity during spike driving. The top surface 124 of the body 120 may be a square platform with chamfered edges (angled at approximately 30 degrees) to facilitate insertion and alignment. The bottom surface 126 may taper inward to transition into the leg bases, creating a seamless connection with the segmented legs 180.

The central feature of the spike stabilizer 100 may be an internal cavity 150 designed to conform to the geometry of a railroad spike. The cavity 150 may be open at the top, with a rectangular or square cross-section that tapers inward to match the spike's shaft and point, ensuring a secure fit. The cavity 150 may have a depth of approximately 50-70% of the stabilizer's height (25-45 mm), allowing it to grip the lower portion of the spike during insertion. The internal walls of the cavity 150 may be slightly angled inward at 2-5 degrees, with a smooth inner surface to reduce friction during driving. The inner dimensions of the cavity 150 may be approximately 10-30 mm wide and 10-40 mm long at the top, narrowing to 5-10 mm wide and 18-22 mm long at the base, aligning with the typical spike profile. The cavity 150 may be surrounded by the outer walls of the body 120, which provide lateral support to prevent collapse under driving forces.

The spike stabilizer 100 and the outer body 120 may exhibit a tapered geometry, transitioning from a square cross-section at the top surface 124 to a narrower base. The top surface 124 may taper to the narrower base. The taper may be gradual, with an angle of approximately 5-10 degrees from vertical, facilitating easy insertion into the tie plate hole 14 while ensuring a tight fit. The top edges may be chamfered at 30 degrees to aid initial placement, and the flare at the top enhances stability by distributing insertion forces across a broader surface area.

Figure 3A:
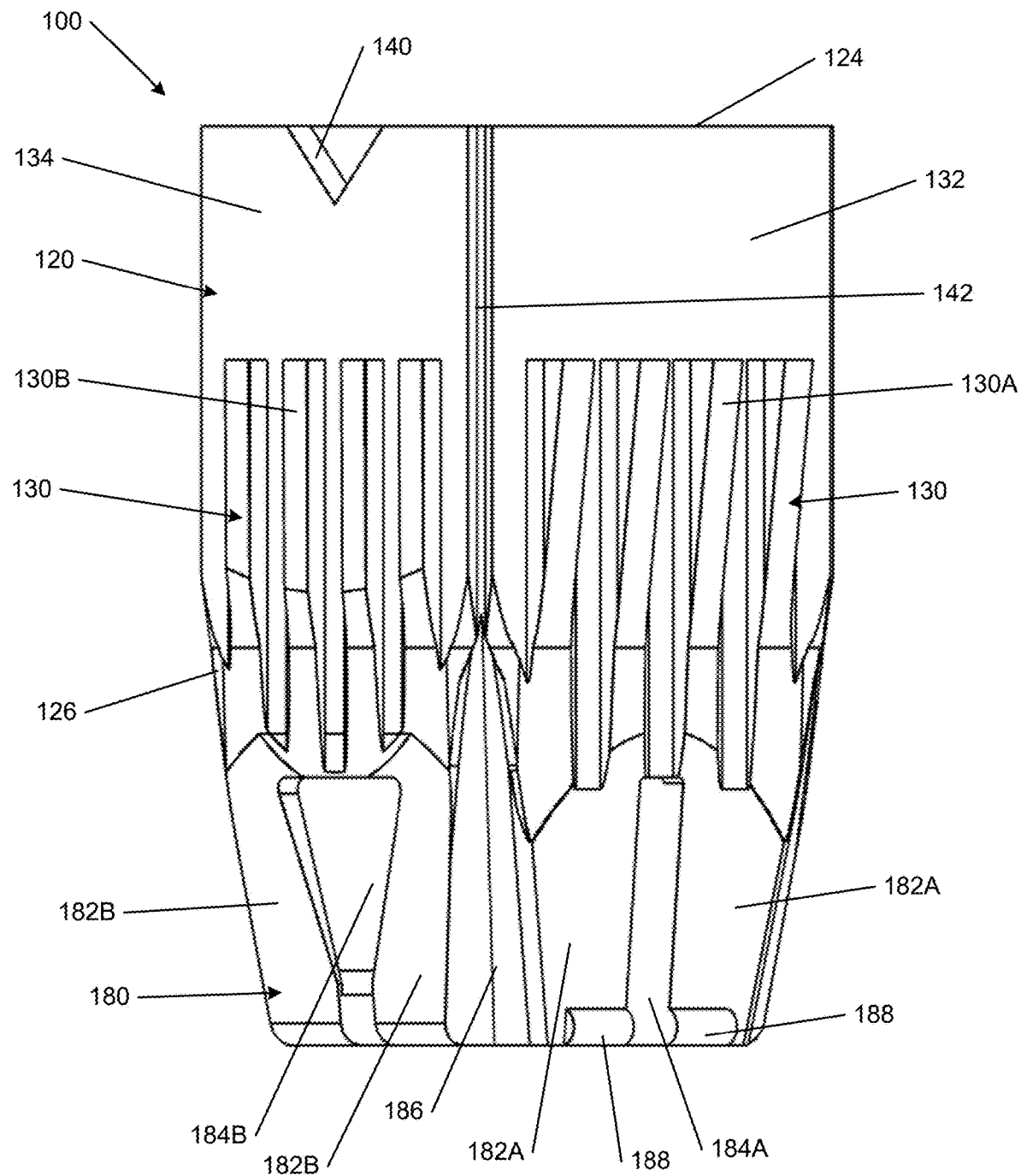
FIG. 3A depicts a diagonal side view of the spike stabilizer from FIG. 2A, according to one or more aspects described herein.
Figure 3B:
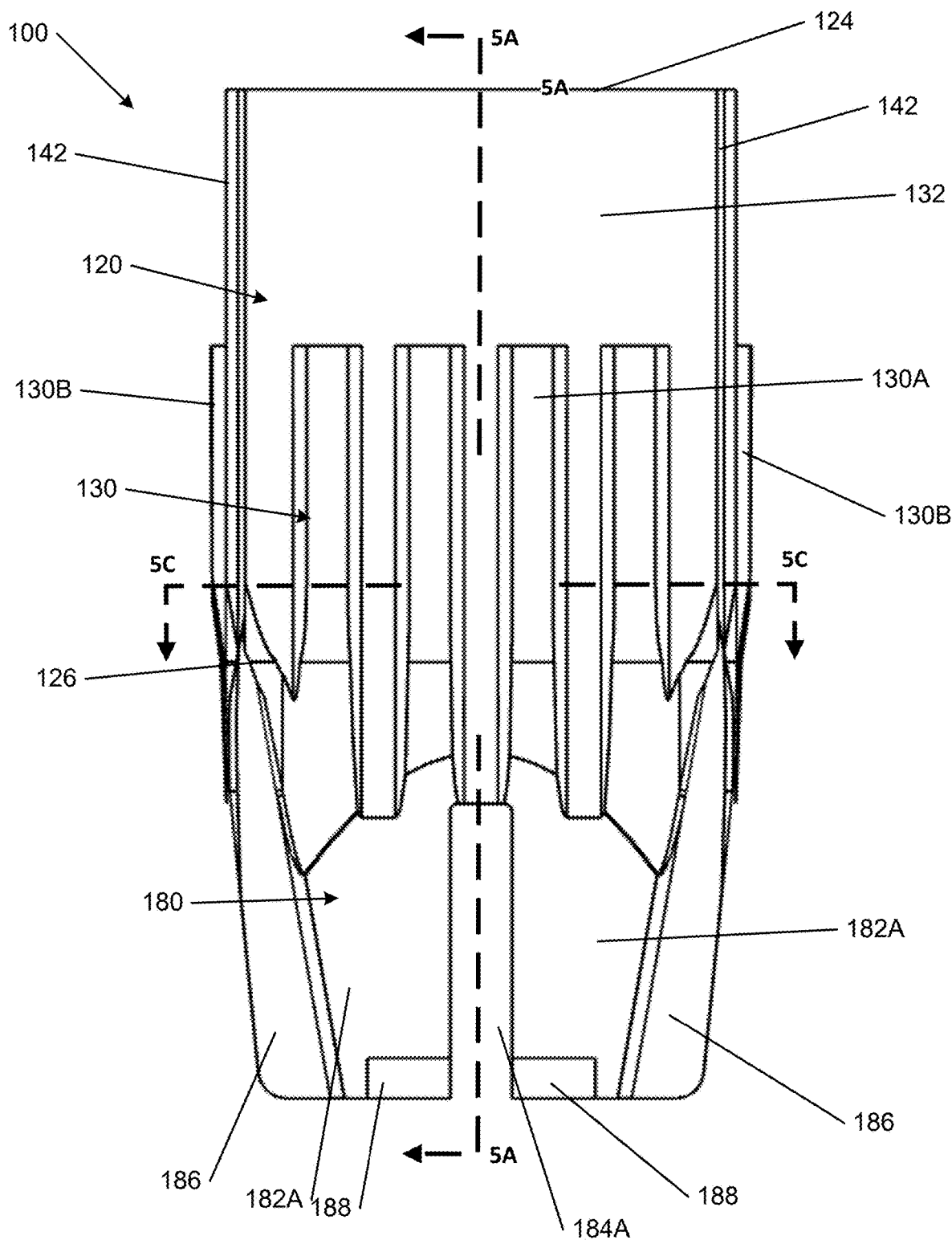
FIG. 3B depicts a side view of the spike stabilizer from FIG. 2A, according to one or more aspects described herein.
Figure 3C:
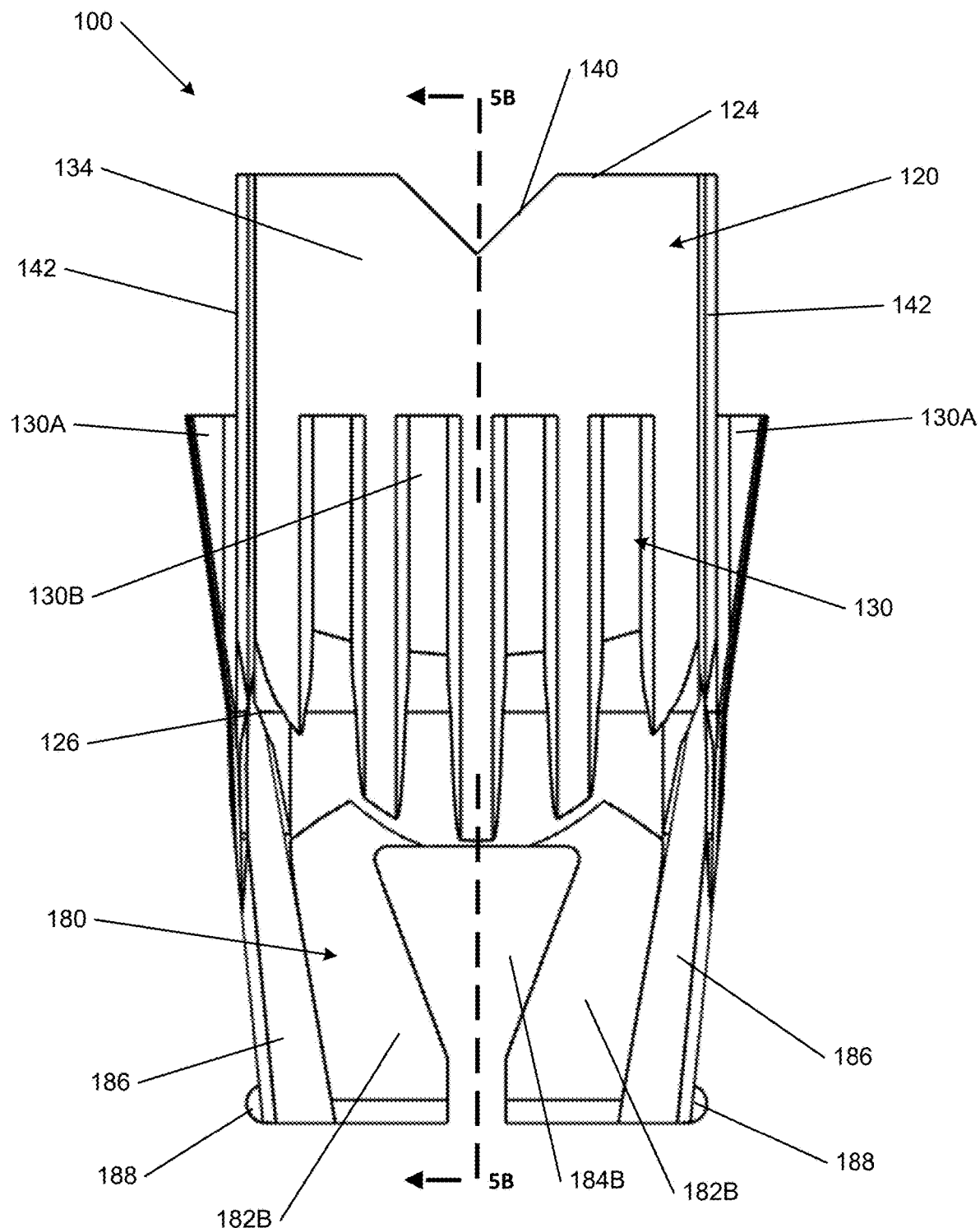
FIG. 3C depicts another side view of the spike stabilizer from FIG. 2A, according to one or more aspects described herein.
Figure 4A:
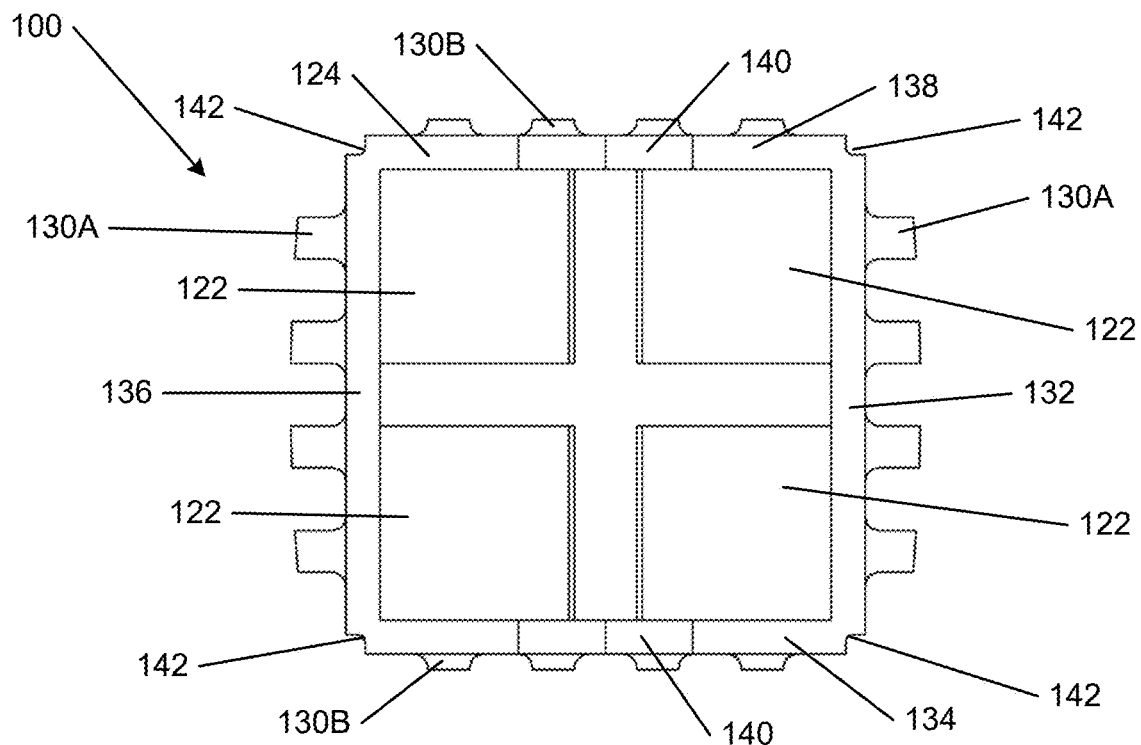
FIG. 4A depicts a top view of the spike stabilizer from FIG. 2A, according to one or more aspects described herein.
Figure 4B:
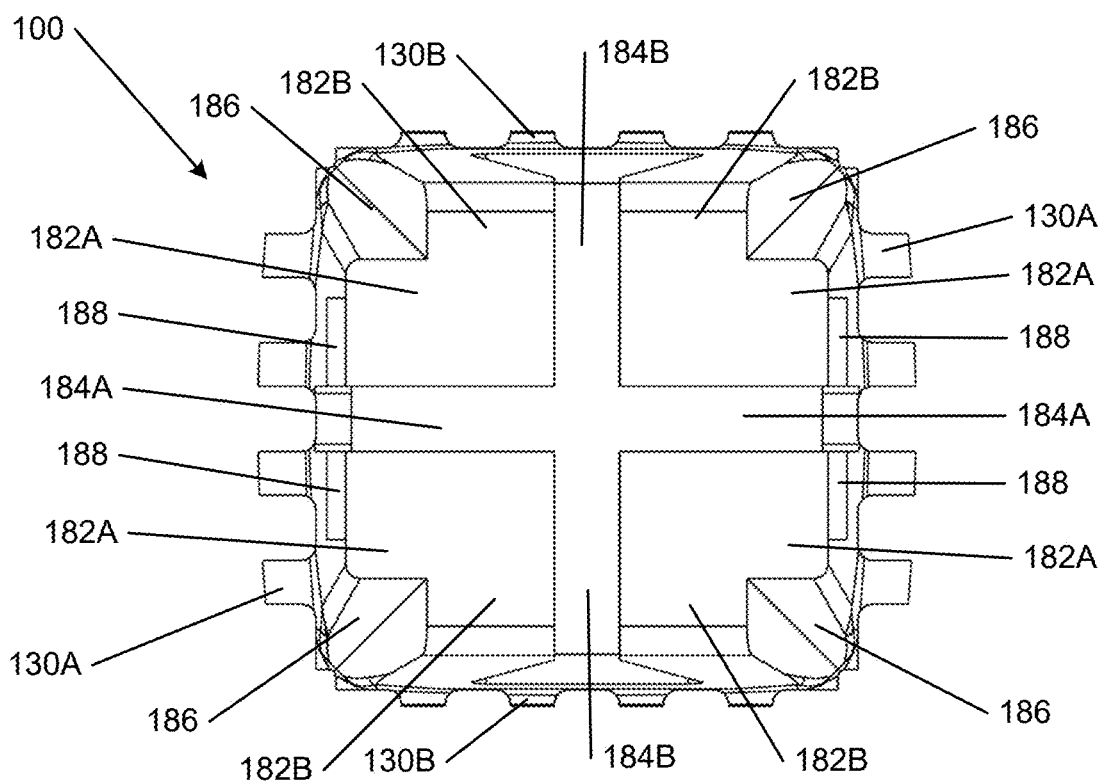
FIG. 4B depicts a bottom view of the spike stabilizer from FIG. 2A, according to one or more aspects described herein.
Figure 5A:
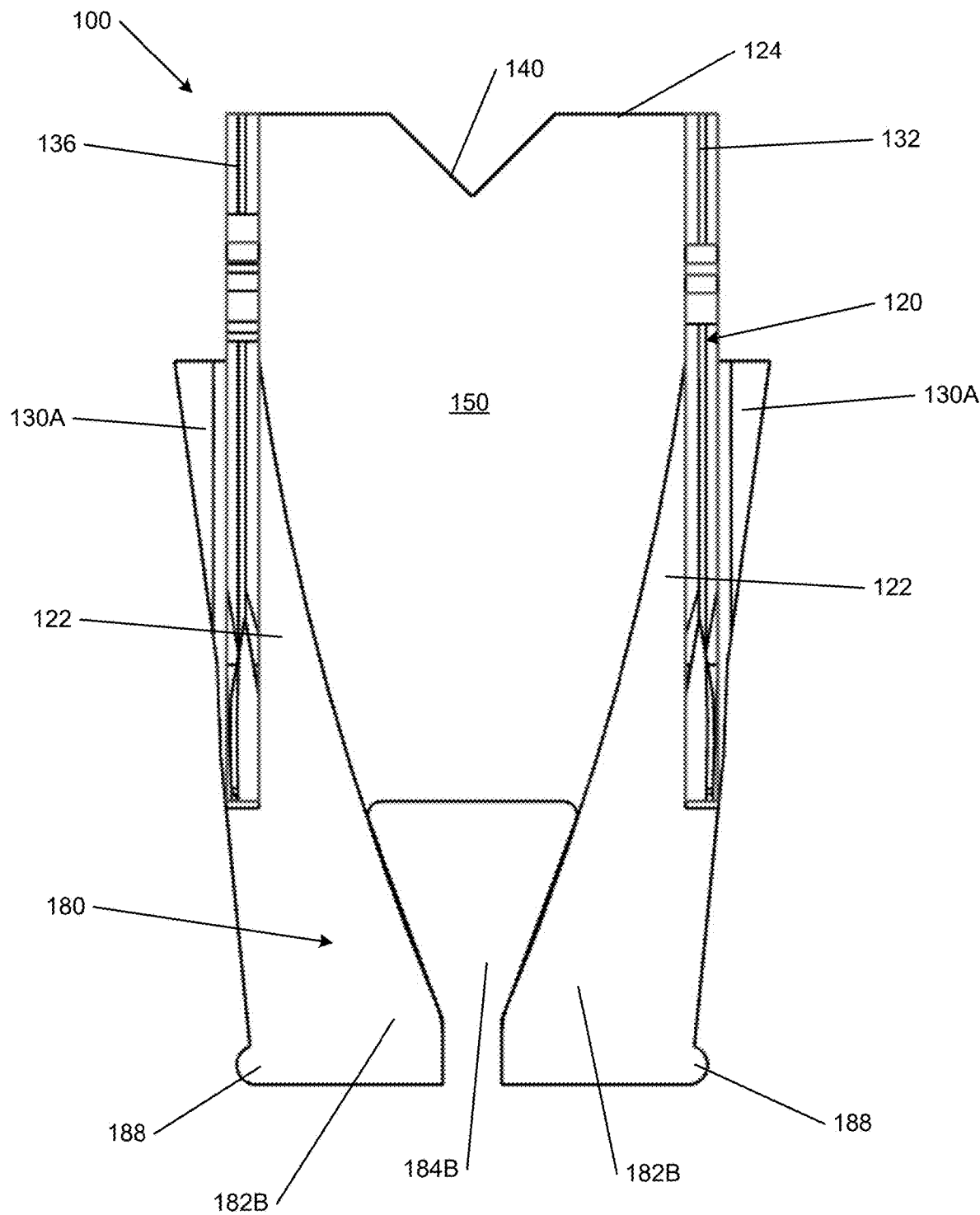
FIG. 5A depicts a cross-section view along 5A-5A from FIG. 3B of the spike stabilizer from FIG. 2A, according to one or more aspects described herein.
Figure 5B:
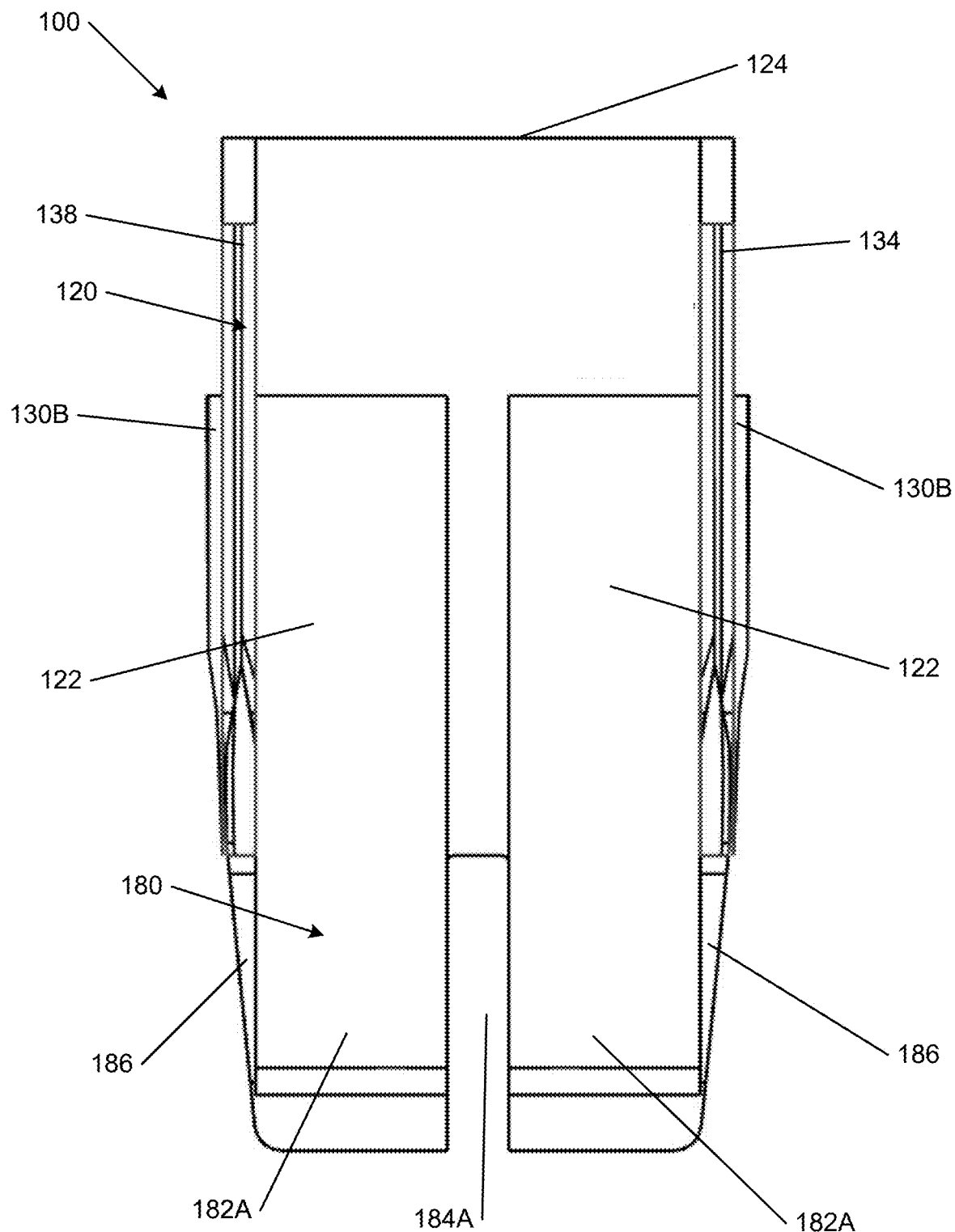
FIG. 5B depicts a cross-section view along 5B-5B from FIG. 3C of the spike stabilizer from FIG. 2A, according to one or more aspects described herein.
Figure 5C:
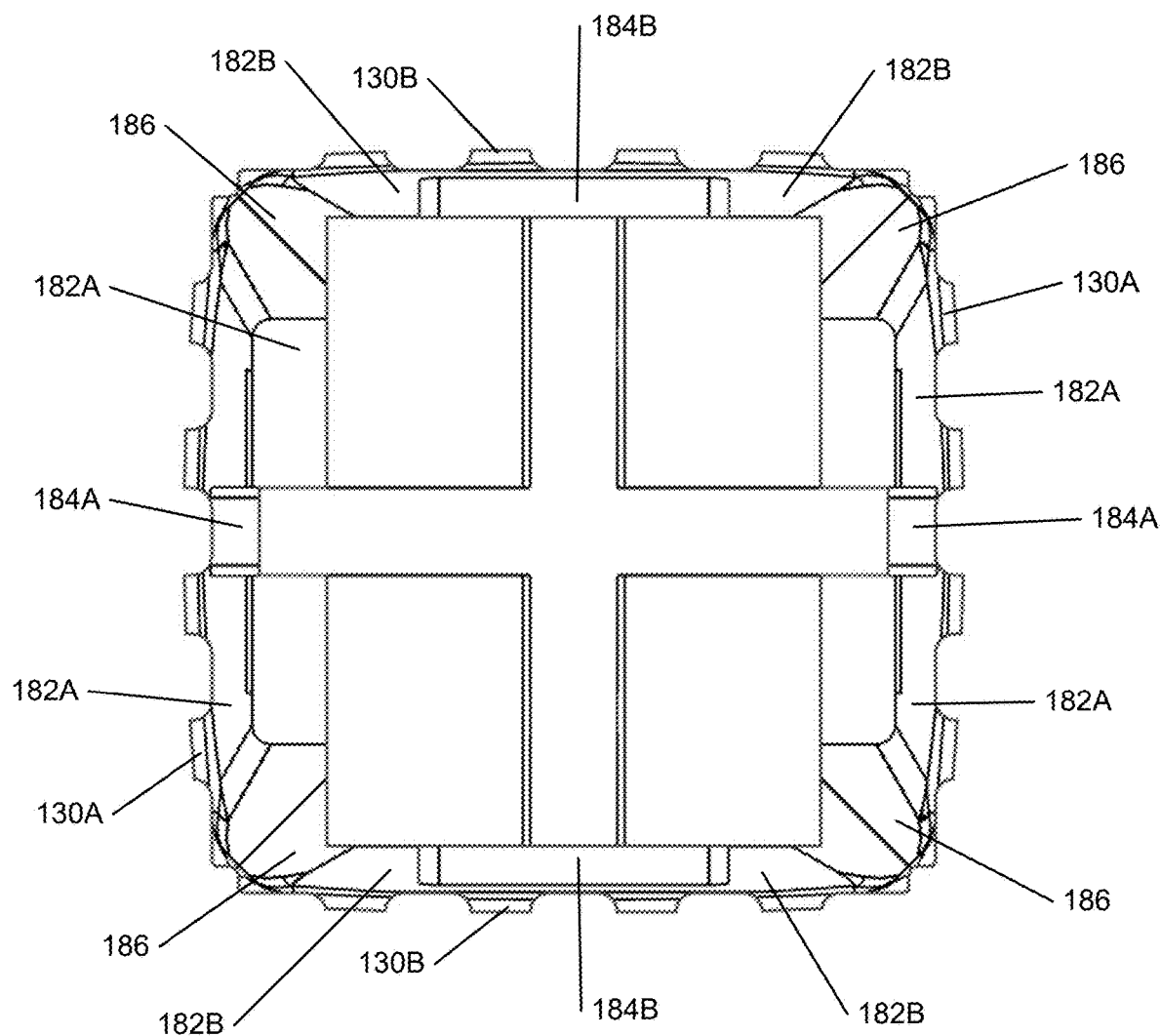
FIG. 5C depicts a cross-section view along 5C-5C from FIG. 3B642 of the spike stabilizer from FIG. 2A, according to one or more aspects described herein.

The spike stabilizer 100 and the body 120 may comprise four sets of segmented, flexible legs 180. Each set of legs 180 may correspond to each side of the square tie plate hole 14. Each leg set 180 may consist of two individual leg segments 182 arranged on each wall of the spike stabilizer with a gap 184 in between the individual leg segments 182. The leg segments 182 and gaps 184 may be various shapes. As shown in FIGS. 3A-3C, on the first wall 132 and third wall 136 of the spike stabilizer 100, the first leg segments 182A may be a rectangular shape and a first gap 184A may also be a rectangular shape. As shown in FIGS. 3A-3C, on the second wall 134 and the fourth wall 138 of the spike stabilizer, the second leg segments 182B may be a tapered prism or truncated pyramid with a square base and a second gap 184B may be the shape of a truncated cone or frustum of a cone. The leg segments 182 and gaps 184 may be other shapes without departing from the invention. Each leg segment 182 may have a length of approximately 10-15 mm, width of approximately 5-10 mm, and a thickness of approximately 1-3 mm. The leg segments 182 may be connected to the adjacent segments by flexible hinges or thin junctions 186. The leg segments 182 may allow the legs to compress inward by up to 20% of their resting width during insertion and expand outward to exert a spring-like force against the tie plate hole's walls. The flexible hinges or thin junctions 186 may be approximately 0.5-1 mm thick. The total height of the leg segments 182 may be approximately 30-40% of the height of the spike stabilizer height, providing robust support. The height of the leg segments 182 may be approximately 7-18 mm. The elongated leg segments 182 may enhance flexibility and resilience, enabling the leg segments 182 to absorb driving forces without permanent deformation. The leg segments 182 may be integrally molded with the body 120, with their bases extending from the tapered bottom surface 126.

At the base of one or more of the leg segments 182, a clip 188 may extend outward. The clip 188 may be located on two of the opposing leg segments 182. As shown in FIGS. 3A-3C, the clips 188 may be located at the base of the leg segments 182 on the first wall 132 and the third wall 136 of the spike stabilizer 100. The clips 188 may be located at the base of the leg segments 182 on other walls without departing from this invention. The clip 188 may be configured to engage the underside of the tie plate 12 or the inner edges of the hole 14. The clips 188 may be formed by an outward bend at the leg's terminus, with a slight hook shape and curving inward to enhance locking strength. The clip 188 may extend at an angle of approximately 30-45 degrees from the vertical. Each clip 188 may have a length of 2-10 mm and a width of 1-3 mm. The one or more clips 188 may prevent the spike stabilizer 100 from dislodging during spike driving, thereby distributing the locking force evenly across the perimeter of the tie plate 12. The clips 188 may be reinforced with a thickened base where the clips 188 join the leg segments 182.

Additionally, the walls 132, 134, 136, 138 and/or segmented legs 182 may include flexible ribs 130 integrated into the walls 132, 134, 136, 138 and/or segmented legs 182. The ribs 130 may flex inward under pressure, ensuring a snug fit across a range of tie plate hole 14 dimensions while maintaining structural integrity. The ribs 130 may be continuous with the outer walls 132, 134, 136, 138, creating a unified surface that enhances the spike stabilizer's adaptability to various hole sizes 14. In some embodiments, and as shown in the FIGS. 3A-3C, the ribs 130 on the first wall 132 and third wall 136 may include first ribs 130A that extend out further than the second ribs 130B on the second wall 134 and the fourth wall 138. The ribs 130 may extend various distances without departing from the invention. As shown in FIGS. 3A-3C, each wall 132, 134, 136, 138 of the spike stabilizer 100 may include four ribs 130. Other numbers of ribs 130 may be located on each wall 132, 134, 136, 138, such as two ribs, three ribs, five ribs, or six ribs. Additionally, each wall 132, 134, 136, 138 may include different numbers of ribs 130 without departing from the invention, for example, the first wall 132 and third wall 136 may include four ribs 130 and the second wall 134 and fourth wall 138 include three ribs 130. Each rib 130 may extend outward by approximately 1-2 mm, or 1 mm from the walls 132, 134, 136, 138 and/or leg segments 182. The ribs 130 may be spaced at intervals of 1-5 mm, or 3 mm along the walls 132, 134, 136, 138 and/or leg segments 182, providing a corrugated texture that accommodates variations in tie plate hole sizes (e.g., up to 2 mm differences due to manufacturing tolerances or wear).

The body 120 and top surface 124 of the body 120 may include a visual alignment guide 140. The visual alignment guide 140 may be in the shape of a triangle, centered and on opposing walls within the square perimeter of the top surface 124. As shown in FIGS. 3A-3C, the visual alignment guides 140 may be located on the top surface 124 of the second wall 134 and the fourth wall 138 of the spike stabilizer 100. The visual alignment guide 140 may serve as a visual guide for workers, ensuring correct orientation with the tie plate hole 14. The visual alignment guide 140 may remain visible under low-light conditions due to the profile. The visual alignment guide 140 may be molded into the top surface 124, with its edges reinforced to withstand handling.

The spike stabilizer 100 may be composed of a biodegradable material, such as a vegetable-based polymer, configured to fit snugly into the square hole 14 of a railroad tie plate 12. Other materials may be utilized for the spike stabilizer 100, such as plastics and/or thermoplastic polymers, and/or polyvinyl chloride (PVC).

FIGS. 6-8B illustrate another example spike stabilizer 600 according to one or more aspects described herein. For the embodiment of FIGS. 6-8B, the features are referred to using similar reference numerals under the "6xx" series of reference numerals, rather than "1xx" as used in the embodiment of FIG. 1A-5C. A "6xx" feature may be similar to a "1xx" feature. Accordingly, certain features of the spike stabilizer 600 that were already described above with respect to the spike stabilizer 100 of FIGS. 1A-5C may be described in lesser detail, or may not be described at all. Additionally, any features described above with respect to the spike stabilizer 100 in FIGS. 1A-5C may be utilized with the spike stabilizer 600.

The spike stabilizer 600 may comprise a rectangular or square-sized body 620 with an internal cavity 650 designed to conform to the geometry of a railroad spike 10. The body 620 may comprise four outer walls that define the internal cavity 650 with legs 680 extending from the body 620. The four outer walls may include a first wall 632, a second wall 634, a third wall 636, and a fourth wall 638, with the first wall 632 being opposite the third wall 636; and the second wall 634 being opposite the fourth wall 638.

As depicted in FIGS. 6-8B, the spike stabilizer 600 may include a body 620 that defines an internal cavity 650. The body 620 of the spike stabilizer 600 may serve as the primary structural framework, integrating the internal cavity 650 and the legs 680. The body 620 may be a hollow, square-based prism shape designed to match the depth of a typical railroad tie plate hole 14. The outer walls of the body 620 may provide structural rigidity. The outer walls of the body 620 may be reinforced with internal vertical ribs or struts. The vertical ribs or struts 622 may connect a top surface 624 of the body 620 and a bottom surface 626 of the body 620 to enhance load-bearing capacity during spike driving. The top surface 624 of the body 620 may be a square platform with chamfered edges to facilitate insertion and alignment.

The central feature of the spike stabilizer 600 may be an internal cavity 650 designed to conform to the geometry of a railroad spike. The cavity 650 may be open at the top, with a rectangular or square cross-section that tapers inward to match the spike's shaft and point, ensuring a secure fit. The cavity 650 may have a depth that allows the cavity 650 to grip the lower portion of the spike 10 during insertion. The internal walls of the cavity 650 may be slightly angled inward, with a smooth inner surface to reduce friction during driving. The inner dimensions of the cavity 650 may be narrow to align with the typical spike profile. The cavity 650 may be surrounded by the outer walls of the body 620, which provide lateral support to prevent collapse under driving forces.

The spike stabilizer 600 and the outer body 620 may exhibit a tapered geometry, transitioning from a square cross-section at the top surface 624 to a narrower base. The top surface 624 may have side lengths that taper to the narrower base. The taper may facilitate easy insertion into the tie plate hole 14 while ensuring a tight fit.

Figure 7A:
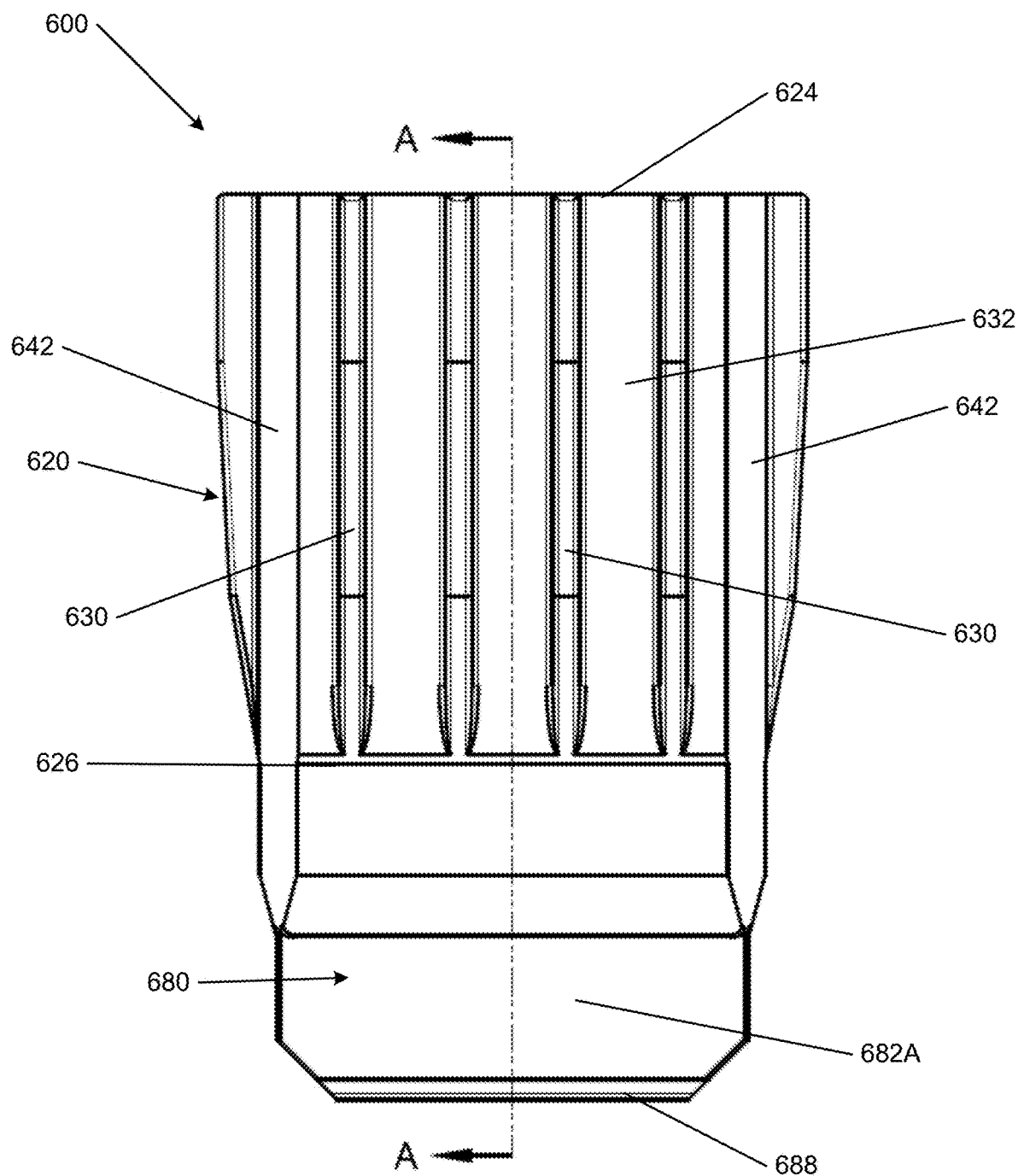
FIG. 7A depicts a side view of the spike stabilizer from FIG. 6, according to one or more aspects described herein.
Figure 7B:
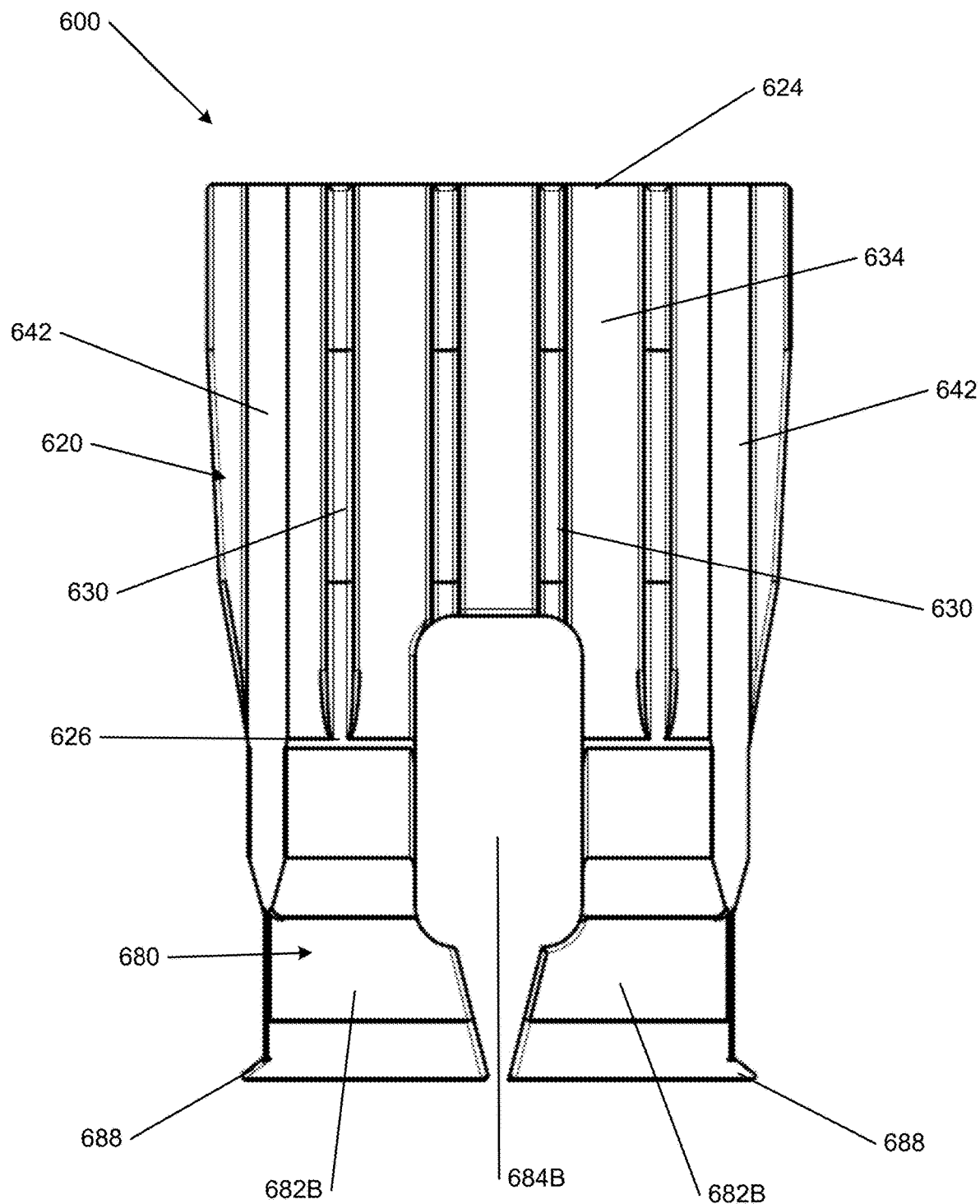
FIG. 7B depicts another side view of the spike stabilizer from FIG. 6, according to one or more aspects described herein.

The spike stabilizer 600 and the body 620 may comprise four sets of flexible legs 680. Each set of legs 680 may correspond to each side of the square tie plate hole 14. The flexible legs 680, leg segments 682, and gaps 684 may be various shapes. As shown in FIG. 7A, on the first wall 632 and third wall 636 of the spike stabilizer 600, the first leg 682A may be a singular leg and may be a rectangular shape. As shown in FIG. 7B, on the second wall 634 and the fourth wall 638, two of the leg sets may consist of two individual leg segments 682B arranged on two walls of the spike stabilizer 600 with a gap 684B in between the individual leg segments 682B. As shown in FIG. 7B, on the second wall 634 and the fourth wall 638 of the spike stabilizer, the individual leg segments 682B may be a rectangular base with a narrower top section and a gap 684B may be the shape of a rectangle with rounded corners and a slight inward curve at the bottom. The leg segments 682 and gaps 684 may be other shapes without departing from the invention. The legs 680 and leg segments 682 may be connected to the adjacent segments by flexible hinges or thin junctions 686. The legs 680 and leg segments 682 may allow the legs to compress inward during insertion and expand outward to exert a spring-like force against the tie plate hole's walls.

The elongated legs 680 and the leg segments 682 may enhance flexibility and resilience, enabling the legs 680 and leg segments 682 to absorb driving forces without permanent deformation.

Figure 6:
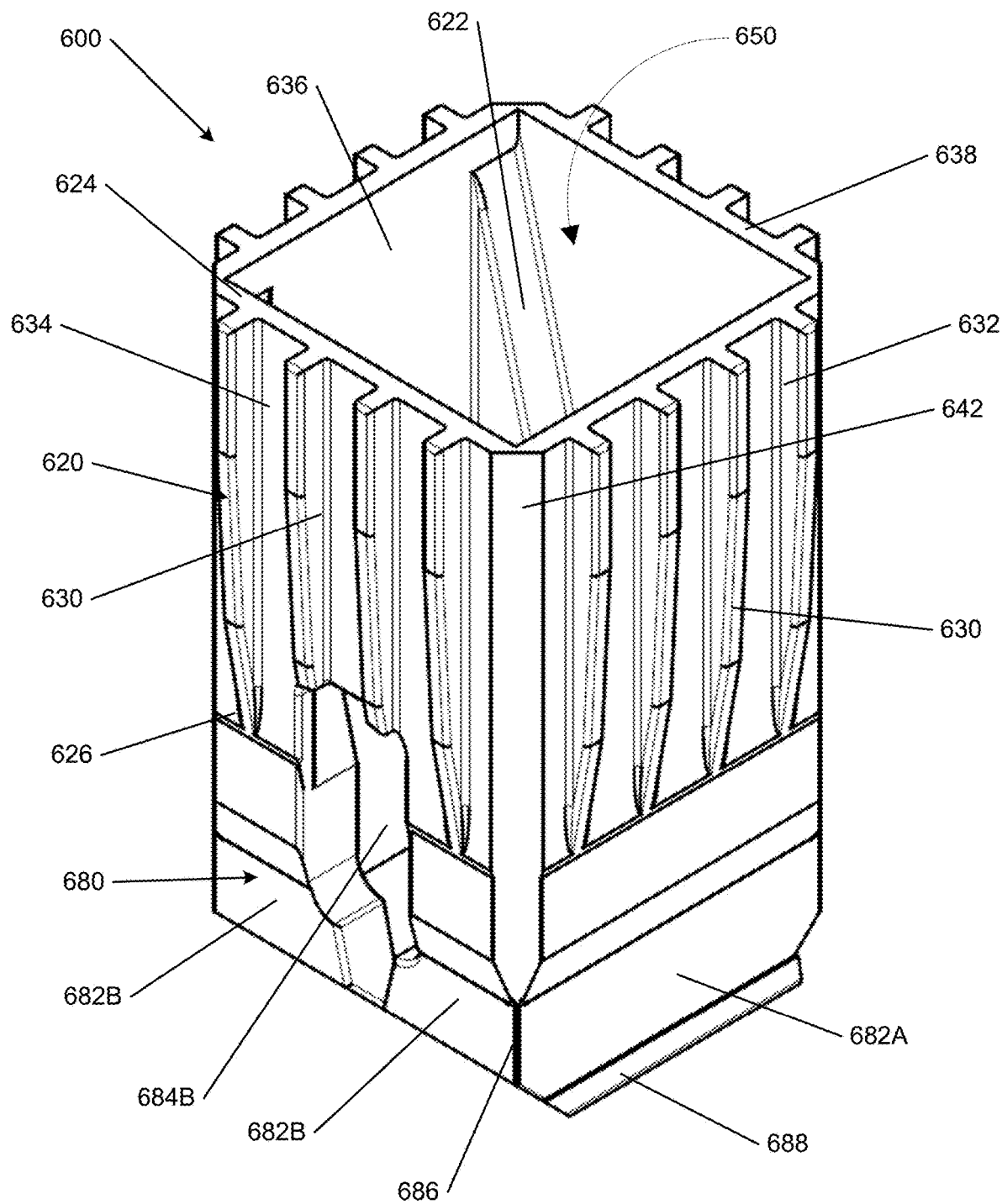
FIG. 6 depicts a side perspective view of another spike stabilizer, according to one or more aspects described herein.

At the base of one or more of the legs 680 or leg segments 682, a clip 688 may extend outward. The clip 688 may be located on two of the opposing leg segments 682. As shown in FIGS. 6 and 7B, the clips 688 may be located at the base of the leg segments 682A on the first wall 632 and the third wall 636 of the spike stabilizer 600. The clips 688 may extend along the entire width of the leg segments 682A. The clips 688 may be located at the base of the leg segments 682 on other walls without departing from this invention. The clip 688 may be configured to engage the underside of the tie plate 12 or the inner edges of the hole 14. The clips 688 may be formed by an outward bend at the leg's terminus, with a slight hook shape and curving inward to enhance locking strength. The one or more clips 688 may prevent the spike stabilizer 600 from dislodging during spike driving, thereby distributing the locking force evenly across the perimeter of the tie plate 12.

Figure 7C:
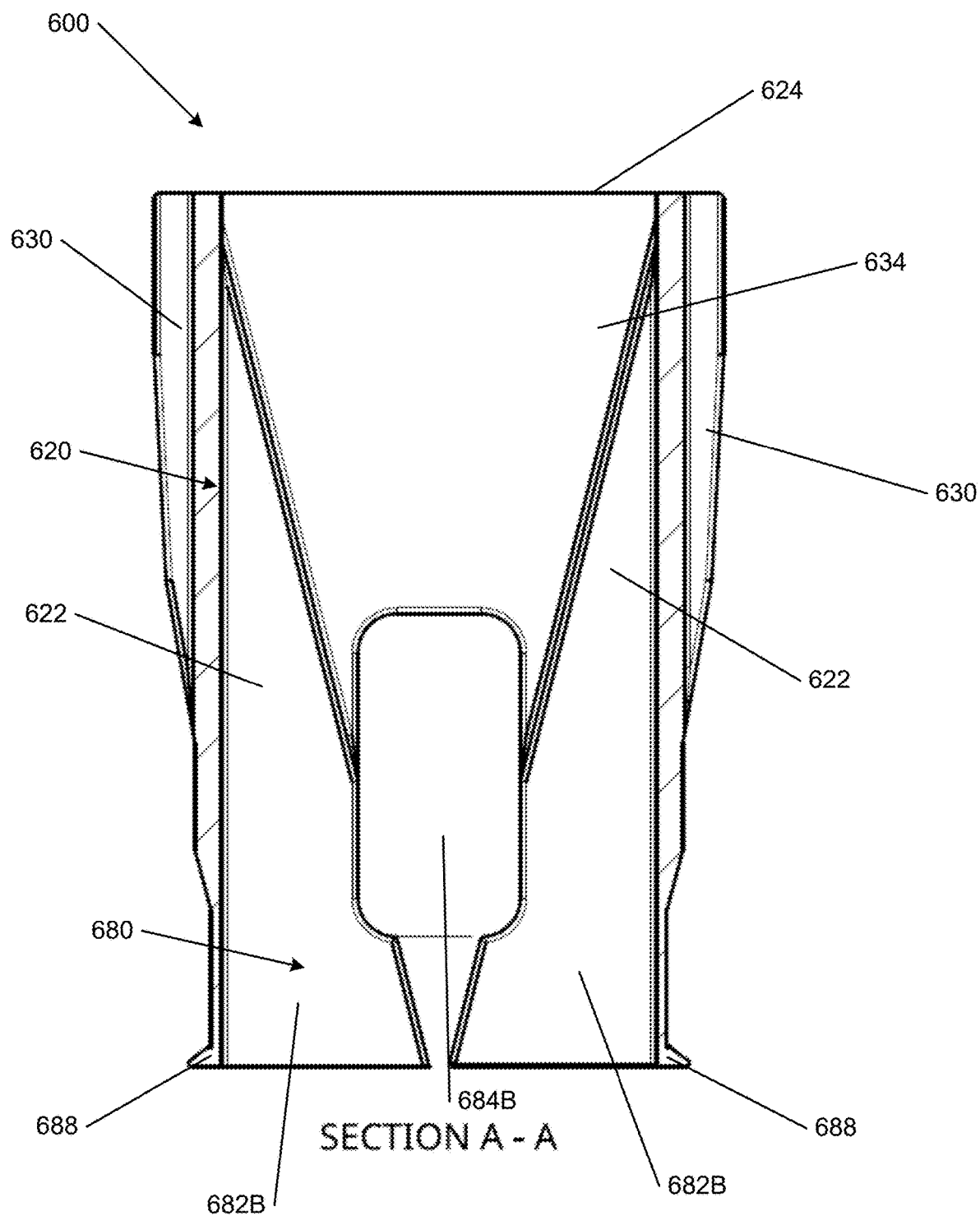
FIG. 7C depicts a cross-section view along A-A from FIG. 7A of the spike stabilizer from FIG. 6, according to one or more aspects described herein.
Figure 8A:
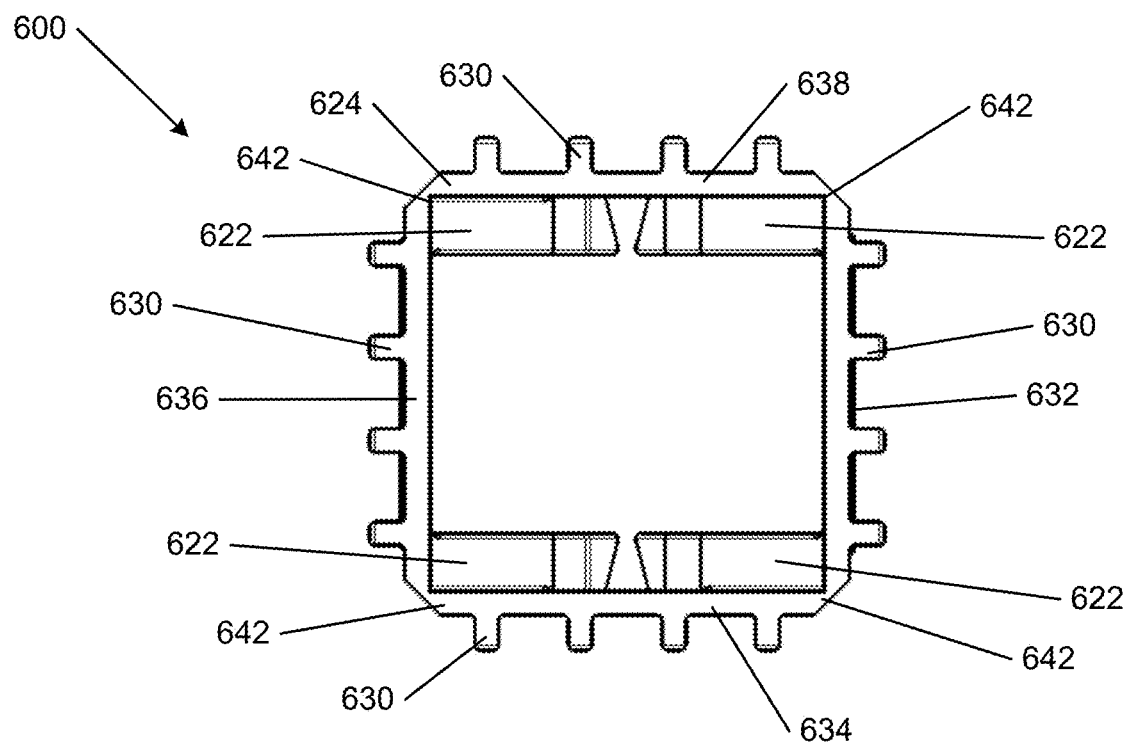
FIG. 8A depicts a top view of the spike stabilizer from FIG. 6, according to one or more aspects described herein.
Figure 8B:
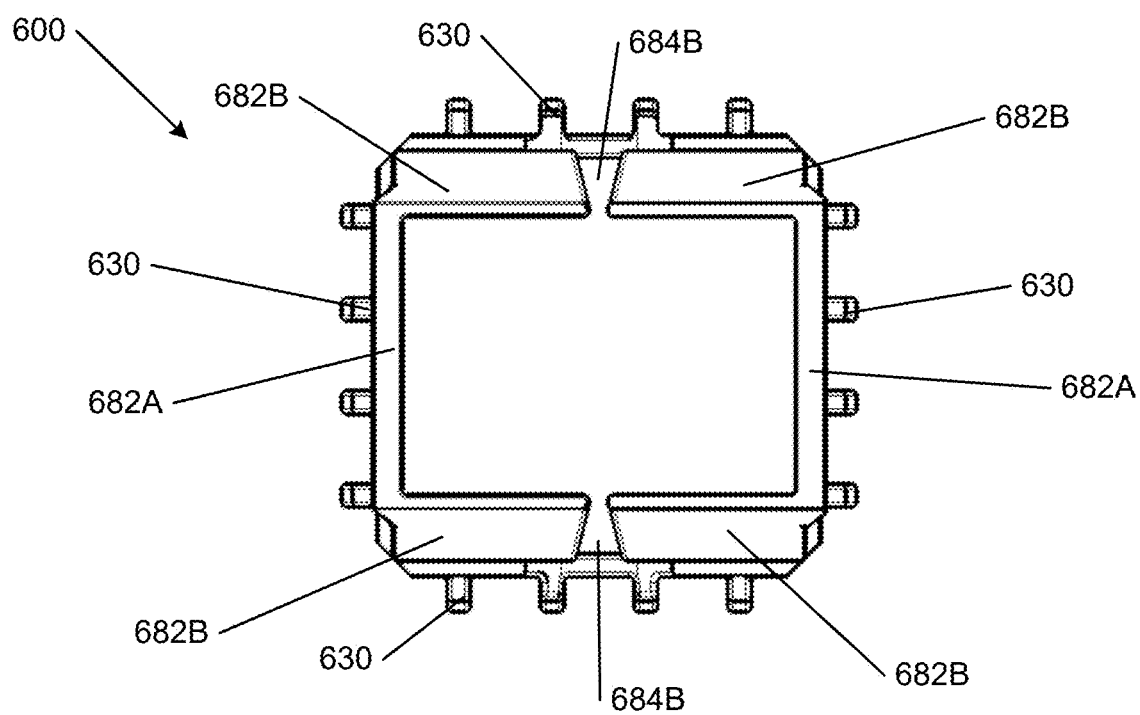
FIG. 8B depicts a bottom view of the spike stabilizer from FIG. 6, according to one or more aspects described herein.

Additionally, the walls 632, 634, 636, 638 and/or segmented legs 682 may include flexible ribs 630 integrated into the walls 632, 634, 636, 638 and/or segmented legs 682. The ribs 630 may flex inward under pressure, ensuring a snug fit across a range of tie plate hole 14 dimensions while maintaining structural integrity. The ribs 630 may be continuous with the outer walls 632, 634, 636, 638, creating a unified surface that enhances the spike stabilizer's adaptability to various hole sizes 14. The ribs 630 may extend various distances without departing from the invention. As shown in FIG. 6, each ribs 630 may extend the same distance from the outer walls 632, 634, 636, 638. As shown in FIG. 6-7B, each wall 632, 634, 636, 638 of the spike stabilizer 600 may include four ribs 630. Other numbers of ribs 630 may be located on each wall 632, 634, 636, 638, such as two ribs, three ribs, five ribs, or six ribs.

The spike stabilizer 600 may be composed of a biodegradable material, such as a vegetable-based polymer, configured to fit snugly into the square hole 14 of a railroad tie plate 12. Other materials may be utilized for the spike stabilizer 600, such as plastics and/or thermoplastic polymers, and/or polyvinyl chloride (PVC).

Methods for using the spike stabilizer 100, 600 with a railroad spike in a railroad application may include various steps, such as: 1. Inserting the spike stabilizer 100, 600 without the railroad spike into the hole of a tie plate, allowing the segmented legs to compress during insertion and expand once in place, with the clips locking into the tie plate. 2. Inserting the railroad spike into the spike stabilizer 100, 600 with the railroad spike's tip inserted into the internal cavity 150 using the visual alignment triangle oriented for correct placement of the railroad spike. 3. Driving the railroad spike using standard tools (e.g., a maul or hydraulic driver), with the spike stabilizer 100, 600 maintaining alignment and stability without additional support. 4. Allowing the spike stabilizer 100, 600 to degrade naturally post-installation.

Another method for using the spike stabilizer 100, 600 with a railroad spike in a railroad application may include the following steps: 1. Attaching the spike stabilizer 100, 600 to the point of a railroad spike, with the spike's tip inserted into the internal cavity and the visual alignment triangle oriented for correct placement. 2. Inserting the spike stabilizer 100, 600 (with the railroad spike) into the square hole of a tie plate, allowing the segmented legs to compress during insertion and expand once in place, with the clips locking into the tie plate. 3. Driving the railroad spike using standard tools (e.g., a maul or hydraulic driver), with the spike stabilizer 100, 600 maintaining alignment and stability without additional support. 4. Allowing the spike stabilizer 100, 600 to degrade naturally post-installation.

Figure 9A:
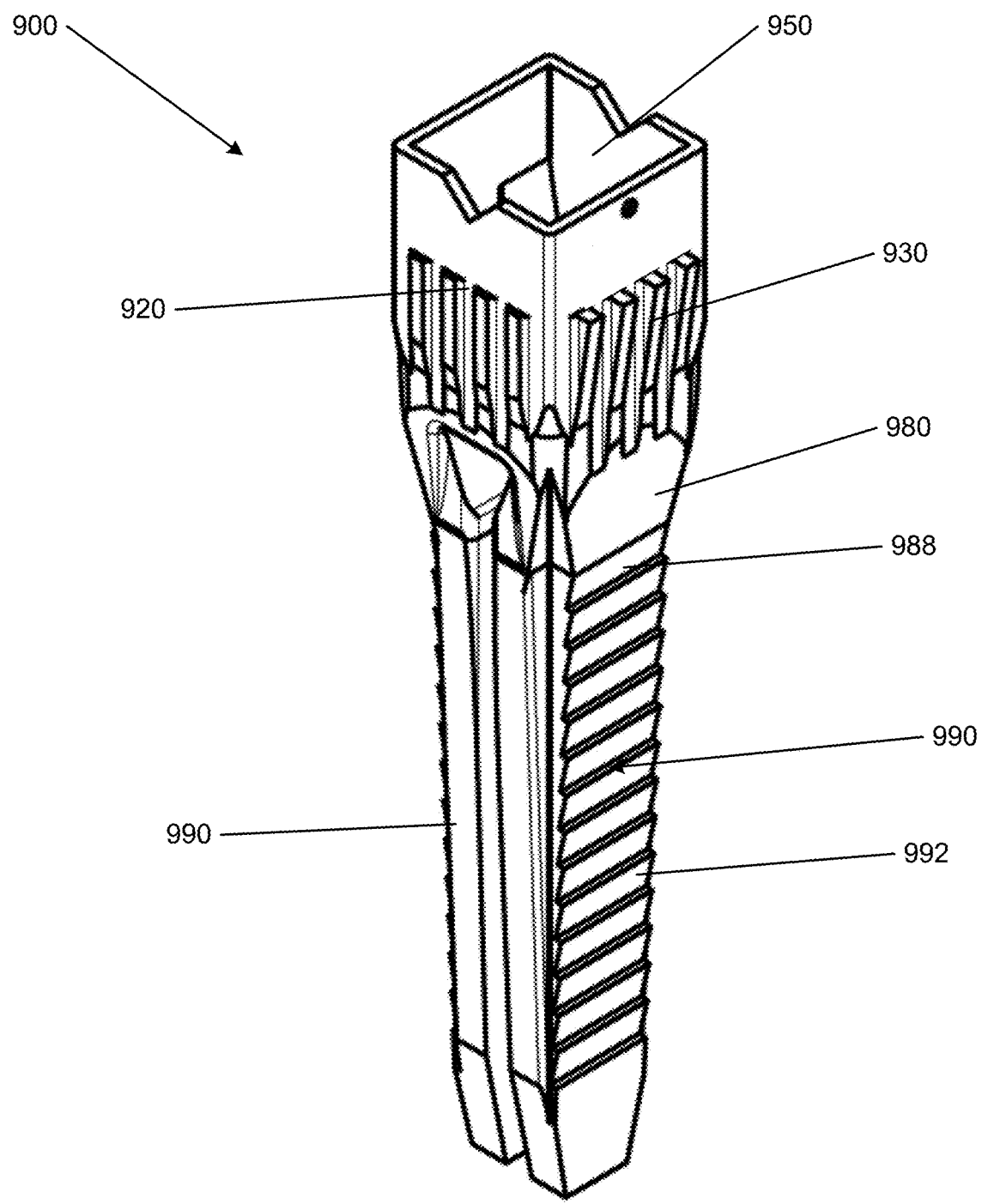
FIG. 9A depicts a side perspective view of a spike and plug stabilizer, according to one or more aspects described herein.
Figure 9B:
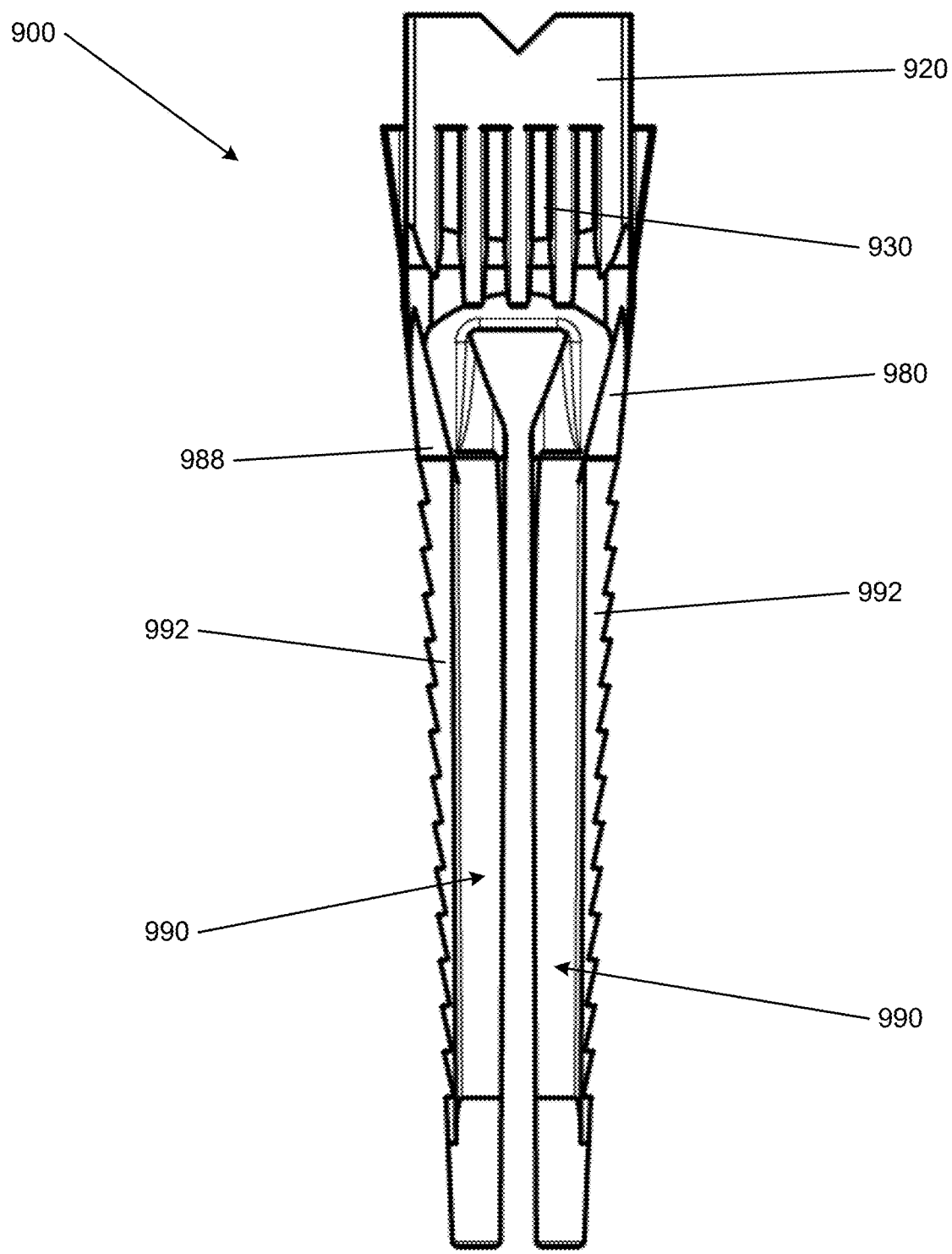
FIG. 9B depicts a side view of the spike and plug stabilizer from FIG. 9A, according to one or more aspects described herein.
Figure 9C:
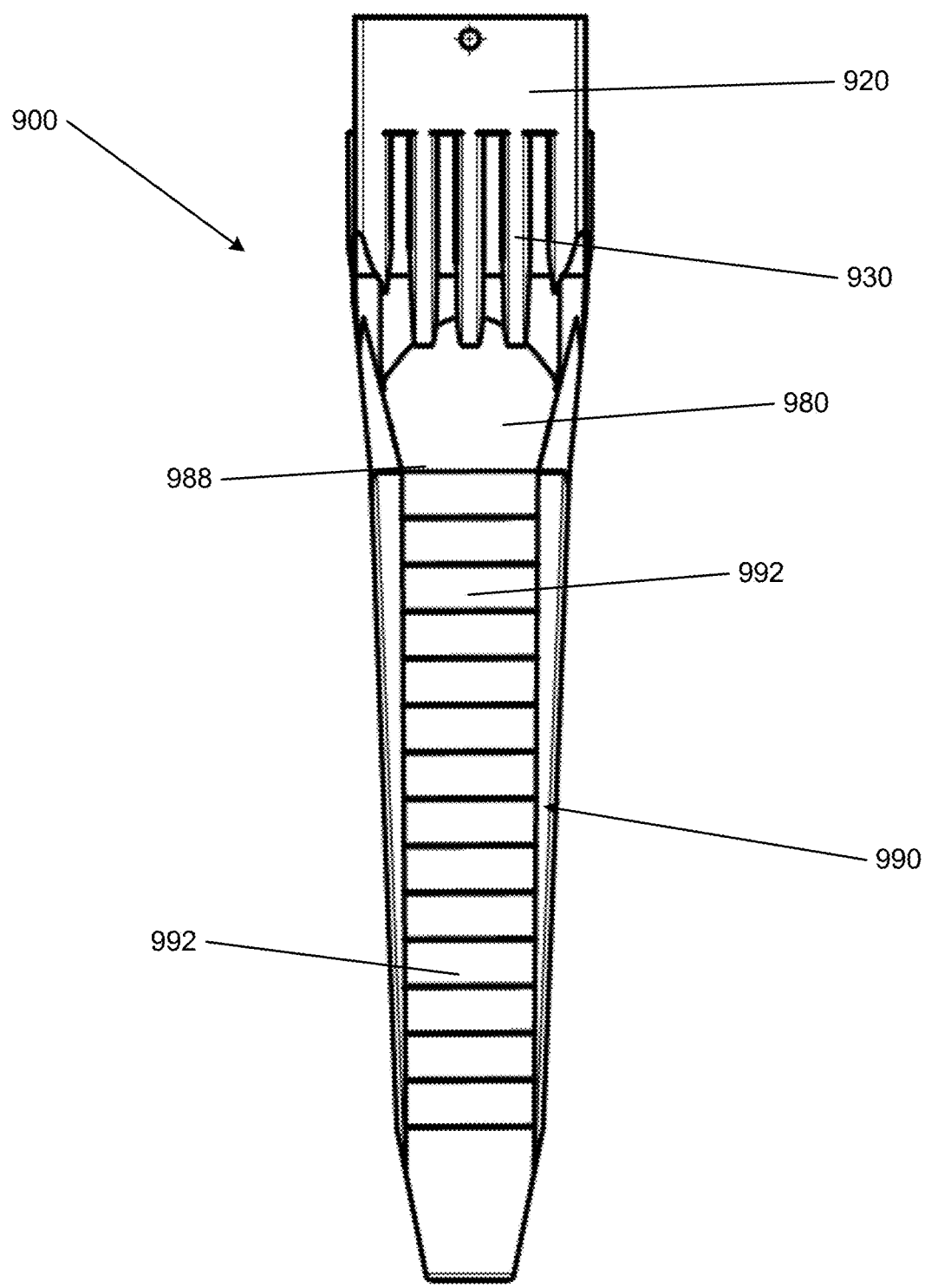
FIG. 9C depicts another side view of the spike and plug stabilizer from FIG. 9A, according to one or more aspects described herein.

FIGS. 9A-9C depict a spike and plug stabilizer 900, which is similar to the spike stabilizer 100, 600 as described above according to one or more aspects described herein. For the embodiment of FIGS. 9A-9C, the features are referred to using similar reference numerals under the "9xx" series of reference numerals, rather than "1xx" as used in the embodiment of FIG. 1A-5C and "6xx" as used in the embodiment of 6-8B. A "9xx" feature may be similar to a "1xx" feature and/or a "6xx" feature. Accordingly, certain features of the spike and plug stabilizer 900 that were already described above with respect to the spike stabilizer 100 of FIGS. 1A-5C and the spike stabilizer 600 of FIGS. 6-8B may be described in lesser detail, or may not be described at all. Additionally, any features described above with respect to the spike stabilizer 100 in FIGS. 1A-5C and spike stabilizer 600 in FIGS. 6-8B may be utilized with the spike and plug stabilizer 900.

The spike and plug stabilizer 900 may be similarly constructed from a biodegradable material and is adapted for spikes. Other materials may be utilized for the spike and plug stabilizer 900, such as plastics and/or thermoplastic polymers, and/or polyvinyl chloride (PVC). The spike and plug stabilizer 900 structure may include one or more of the following: a body 920, an internal cavity 950, legs 980, clips 988, and ribs 930, similar to the spike stabilizer 100, 600. A plug 990 may extend from the bottom surface or may be integrated with the legs 980. The plug 990 may include ribs or fins 992 extending from the plug 990. The plug 990 may end up filling the existing hole in the railroad tie. The ribs or fins 992 may extending 1-3 mm outward and engage the hole's inner surfaces, securing the spike and reducing fatigue compared to wood plugs or polyurethane foam.

The method for using the spike and plug stabilizer 900 may include: (1) inserting the spike and plug stabilizer 900 into a pre-existing hole, with the ribbed or finned plug 990 filling the hole and engaging the inner surfaces of the hole; (2) inserting the spike into the cavity of the spike and plug stabilizer 900; (3) driving the spike, with the stabilizer and plug 900 ensuring alignment and minimizing injury risks; (4) the plug 990 reduces spike fatigue by preventing movement, without the settling time required by polyurethane foam, improving track durability.

There are many benefits to the spike stabilizer 100, spike stabilizer 600, and/or spike and plug stabilizer 900. The spike stabilizer 100, spike stabilizer 600, and/or spike and plug stabilizer 900 offer one or more of the following benefits: efficiency: enable single-worker operations, reducing labor and time compared to conventional methods requiring multiple workers; safety: minimize risks of hammer mishits, misalignment, or back strain by stabilizing spikes during driving; environmental sustainability: use biodegradable materials that decompose without leaving harmful residues, reducing waste in railroad and construction environments; and versatility: accommodate variations in tie plate hole sizes or wood densities through the flexible, segmented legs and integrated ribs.

The present disclosure is disclosed above and in the accompanying drawings with reference to a variety of examples. The purpose served by the disclosure, however, is to provide examples of the various features and concepts related to the disclosure, not to limit the scope of the invention. It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, one skilled in the relevant art will recognize that numerous variations and modifications may be made to the examples described above without departing from the scope of the present disclosure. Thus, the spirit and scope of the invention should be construed broadly as set forth in the appended claims.

What is claimed is:

1. A spike stabilizer for use with a railroad spike and a railroad tie plate and a railroad tie plate hole, comprising:
   a body having a hollow, square-based prism shape including four outer walls defining an internal cavity configured to conform to the railroad spike and extending from a top surface of the body to a bottom surface of the body, wherein the body exhibits a tapered geometry from the top surface to the bottom surface;
   the internal cavity being open at the top surface of the body, having a rectangular or square cross-section that tapers inward;
   a plurality of legs extending from the bottom surface of the body, each leg comprising segmented leg segments configured to compress inward and expand outward to engage the railroad tie plate hole; and
   at least one clip extending outward from a base of one or more leg segments, the clip configured to engage an underside of the railroad tie plate or inner edges of the railroad tie plate hole.

2. The spike stabilizer of claim 1, wherein the four outer walls include a first wall, a second wall, a third wall opposite the first wall, and a fourth wall opposite the second wall, each wall having a uniform thickness of approximately 1 mm and reinforced with internal vertical ribs.

3. The spike stabilizer of claim 1, wherein the top surface of the body is a square platform with chamfered edges, and the bottom surface tapers inward to transition into the leg segments.

4. The spike stabilizer of claim 1, wherein the body has a height of approximately 25-45 mm and a width of approximately 15-35 mm.

5. The spike stabilizer of claim 1, wherein the internal cavity has inner dimensions of approximately 10-30 mm wide and 10-40 mm long at the top, narrowing to 5-10 mm wide and 18-22 mm long at the base, with internal walls angled inward at 2-5 degrees.

6. The spike stabilizer of claim 1, wherein the tapered geometry of the base includes a taper having an angle of approximately 5-10 degrees from vertical.

7. The spike stabilizer of claim 1, wherein each set of legs corresponds to a side of a square tie plate hole, each set comprising two leg segments separated by a gap.

8. The spike stabilizer of claim 7, wherein the leg segments have a length of approximately 10-15 mm, a width of approximately 5-10 mm, and a thickness of approximately 1-3 mm.

9. The spike stabilizer of claim 7, wherein the leg segments on opposing walls are shaped differently, with leg segments on a first and third wall being rectangular and leg segments on a second and fourth wall being tapered prisms or truncated pyramids.

10. The spike stabilizer of claim 1, wherein the clip extends at an angle of approximately 30-45 degrees from vertical, has a length of 2-10 mm and a width of 1-3 mm, and is reinforced with a thickened base.

11. The spike stabilizer of claim 1, further comprising flexible ribs integrated into the outer walls and leg segments, the ribs extending outward by approximately 1-2 mm and spaced at intervals of 3 mm to accommodate variations in tie plate hole dimensions.

12. The spike stabilizer of claim 1, further comprising a visual alignment guide molded into the top surface of the body, the guide being triangular and located on opposing walls to facilitate correct orientation with the railroad tie plate hole.

13. A spike stabilizer for use with a railroad spike and a pre-existing railroad tie plate hole, comprising:
   a body having a hollow, square-based prism shape including four outer walls defining an internal cavity configured to conform to the railroad spike and extending from a top surface of the body to a bottom surface of the body, wherein the body exhibits a tapered geometry from the top surface to the bottom surface;
   the internal cavity being open at the top surface of the body, having a rectangular or square cross-section that tapers inward;
   a plurality of legs extending from the bottom surface of the body, each leg comprising segmented leg segments configured to compress inward and expand outward to engage the railroad tie plate hole; and
   a plug component integrated with the legs, the plug component having ribs or fins extending outward by 1-3 mm to engage inner surfaces of the pre-existing railroad tie plate hole, enhancing spike stability and reducing spike fatigue.

14. The spike stabilizer of claim 13 further comprising: at least one clip extending outward from a base of one or more leg segments, the clip configured to engage an underside of the railroad tie plate or inner edges of the railroad tie plate hole.

15. The spike stabilizer of claim 13, wherein the plug component is integrally molded with the body or legs, and the ribs or fins are spaced at intervals of 2-5 mm along the plug.

16. The spike stabilizer of claim 13, further comprising flexible ribs integrated into the outer walls and leg segments, the ribs extending outward by approximately 1-2 mm and spaced at intervals of 3 mm to accommodate variations in pre-existing tie plate hole dimensions.

17. A method for installing a railroad spike using a spike stabilizer in a railroad application, the method comprising:
   inserting the spike stabilizer into a square hole of a railroad tie plate, wherein the spike stabilizer comprises a body having including four outer walls defining an internal cavity and segmented legs that compress during insertion and expand once in place, and at least one clip that engages an underside of the tie plate or inner edges of the hole to lock the spike stabilizer in position;

inserting the railroad spike into the internal cavity of the spike stabilizer, the internal cavity being open at a top surface of the body and configured to conform to the railroad spike; and driving the railroad spike into the tie plate using a standard tool, wherein the spike stabilizer maintains alignment and stability of the railroad spike during driving.

18. The method of claim 17, wherein driving the railroad spike is performed using a maul or a hydraulic driver.

19. The method of claim 17, wherein the segmented legs exert a spring-like force against the walls of the tie plate hole to enhance stability.

20. The method of claim 17, wherein the segmented legs of the spike stabilizer include flexible ribs that extend outward by approximately 1-2 mm, the ribs flexing inward under pressure to accommodate variations in the tie plate hole dimensions during insertion.

21. The method of claim 17, wherein a visual alignment guide on the top surface is used to orient the railroad spike for correct placement, wherein the visual alignment guide is a triangular shape molded into the top surface of the spike stabilizer on opposing walls.

22. The method of claim 17, wherein the four outer walls include a first wall, a second wall, a third wall opposite the first wall, and a fourth wall opposite the second wall, each wall having a uniform thickness of approximately 1 mm and reinforced with internal vertical ribs.

23. The method of claim 17, wherein the body exhibits a tapered geometry from the top surface to a bottom surface of the body.

24. A method for installing a railroad spike using a spike stabilizer in a railroad application, the method comprising:

inserting the railroad spike stabilizer into the pre-existing square hole of a railroad tie plate, wherein the railroad spike stabilizer comprises a body having four outer walls defining an internal cavity, segmented legs that compress during insertion and expand once in place, at least one clip that engages an underside of the tie plate or inner edges of the hole, and a plug component with ribs or fins that engage inner surfaces of the pre-existing hole to lock the railroad spike stabilizer in position;

inserting the railroad spike into the internal cavity of the railroad spike stabilizer, the internal cavity being open at a top surface of the body and configured to conform to the railroad spike;

driving the railroad spike into the tie plate using a standard tool, wherein the railroad spike stabilizer and plug component maintain alignment and stability of the railroad spike during driving, reducing spike fatigue and worker injury risks by preventing movement within the pre-existing hole.

\* \* \* \* \*